US008674845B2

(12) United States Patent  
Carter et al.

(10) Patent No.: US 8,674,845 B2
(45) Date of Patent: *Mar. 18, 2014

(54) SYSTEMS AND METHODS FOR LOCATING AND CONTROLLING POWERED VEHICLES USING A RECEIVED STRENGTH INDICATION SIGNAL

(75) Inventors: Scott J. Carter, Seal Beach, CA (US); Jesse M. James, Ladera Ranch, CA (US); Stephen E. Hannah, Placentia, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 13/107,770

(22) Filed: May 13, 2011

(65) Prior Publication Data

US 2011/0279252 A1    Nov. 17, 2011

Related U.S. Application Data

(63) Continuation of application No. 11/510,518, filed on Aug. 25, 2006, now Pat. No. 7,944,368.

(60) Provisional application No. 60/711,135, filed on Aug. 25, 2005.

(51) Int. Cl.
*G08B 21/00* (2006.01)

(52) U.S. Cl.
USPC .................................. 340/686.6; 340/426.11

(58) Field of Classification Search
USPC ........... 340/539.1, 539.13, 988, 568.5, 686.6, 340/426.11; 701/408
See application file for complete search history.

(56) References Cited

U.S. PATENT DOCUMENTS

| 2,964,140 | A | 12/1960 | Berezny |
| 3,002,370 | A | 10/1961 | La Brie |
| 3,031,037 | A | 4/1962 | Stollman |
| 3,031,038 | A | 4/1962 | Chait |
| 3,117,655 | A | 1/1964 | Skupas et al. |

(Continued)

FOREIGN PATENT DOCUMENTS

| CN | 101171147 B | 7/2011 |
| GB | 2379804 A | 3/2003 |

(Continued)

OTHER PUBLICATIONS

Sales presentation of Gatekeeper Systems, Inc. for Purchek™ push-out prevention system, 2004.
Press release titled "Purchek™—a Trolley-based Anti-theft Solution from Gatekeeper Garners Huge Attention at the 2005 Retail Middle East Exhibition," Apr. 28, 2005.

(Continued)

*Primary Examiner* — Jeffery Hofsass
(74) *Attorney, Agent, or Firm* — Knobbe, Martens, Olson & Bear, LLP

(57) ABSTRACT

A system for controlling movement of a personal mobility vehicle near a restricted region is disclosed. In one embodiment, the system includes a detector that is configured to be disposed on the personal mobility vehicle and that is configured to receive an electromagnetic signal transmitted to the restricted region. The system also includes a control unit configured to communicate with the detector. The control unit is further configured to determine proximity of the detector to the restricted region using information related to the signal received by the detector. The control unit is also configured to provide a command to inhibit movement of the personal mobility vehicle in response to the determined proximity of the vehicle to the restricted region.

20 Claims, 9 Drawing Sheets

(56) References Cited

U.S. PATENT DOCUMENTS

| | | | |
|---|---|---|---|
| 3,317,841 A | 5/1967 | Umanoff |
| 3,380,546 A | 4/1968 | Rabjohn |
| 3,394,945 A | 7/1968 | Steier et al. |
| 3,475,036 A | 10/1969 | Smith |
| 3,590,962 A | 7/1971 | Parker et al. |
| 3,652,103 A | 3/1972 | Higgs |
| 4,037,882 A | 7/1977 | Taylor |
| 4,093,900 A | 6/1978 | Plunkett |
| 4,242,668 A | 12/1980 | Herzog |
| 4,577,880 A | 3/1986 | Bianco |
| 4,591,175 A | 5/1986 | Upton et al. |
| 4,629,036 A | 12/1986 | Choy |
| 4,742,857 A | 5/1988 | Gandhi |
| 4,748,395 A | 5/1988 | Reynolds |
| 4,772,880 A | 9/1988 | Goldstein et al. |
| 4,849,735 A | 7/1989 | Kirtley et al. |
| 4,868,544 A | 9/1989 | Havens |
| 4,926,161 A | 5/1990 | Cupp |
| 4,973,952 A | 11/1990 | Malec et al. |
| 5,000,297 A | 3/1991 | Shaw et al. |
| 5,036,935 A | 8/1991 | Kohara |
| 5,053,692 A | 10/1991 | Craddock |
| 5,053,768 A | 10/1991 | Dix, Jr. |
| 5,068,654 A | 11/1991 | Husher |
| 5,072,956 A | 12/1991 | Tannehill |
| 5,115,159 A | 5/1992 | Takamiya et al. |
| 5,194,844 A | 3/1993 | Zelda |
| 5,250,789 A | 10/1993 | Johnsen |
| 5,283,550 A | 2/1994 | MacIntyre |
| 5,287,266 A | 2/1994 | Malec et al. |
| 5,315,290 A | 5/1994 | Moreno et al. |
| 5,318,144 A | 6/1994 | Berlinger, Jr. |
| 5,357,182 A | 10/1994 | Wolfe et al. |
| 5,382,854 A | 1/1995 | Kawamoto et al. |
| 5,394,962 A | 3/1995 | Gray |
| 5,402,106 A | 3/1995 | DiPaolo et al. |
| 5,406,271 A | 4/1995 | Sonnendorfer et al. |
| 5,426,561 A | 6/1995 | Yen et al. |
| 5,432,412 A | 7/1995 | Harris et al. |
| 5,434,781 A | 7/1995 | Alofs et al. |
| 5,438,319 A | 8/1995 | Zeytoonjian et al. |
| 5,485,520 A | 1/1996 | Chaum et al. |
| 5,491,670 A | 2/1996 | Weber |
| 5,525,967 A | 6/1996 | Azizi et al. |
| 5,572,108 A | 11/1996 | Windes |
| 5,574,469 A | 11/1996 | Hsu |
| 5,576,691 A | 11/1996 | Coakley et al. |
| 5,580,093 A | 12/1996 | Conway |
| 5,586,050 A | 12/1996 | Makel et al. |
| 5,598,144 A | 1/1997 | Lace |
| 5,600,191 A | 2/1997 | Yang |
| 5,607,030 A | 3/1997 | Swift et al. |
| 5,640,146 A | 6/1997 | Campana, Jr. |
| 5,646,616 A | 7/1997 | Komatsu |
| 5,719,555 A | 2/1998 | Zeytoonjian et al. |
| 5,745,036 A | 4/1998 | Clare |
| 5,806,862 A | 9/1998 | Merryman et al. |
| 5,818,134 A | 10/1998 | Yang et al. |
| 5,821,513 A | 10/1998 | O'Hagan et al. |
| 5,821,856 A | 10/1998 | Lace |
| 5,831,530 A | 11/1998 | Lace et al. |
| 5,949,331 A | 9/1999 | Schofield et al. |
| 6,002,348 A | 12/1999 | Greene et al. |
| 6,008,546 A | 12/1999 | Sage |
| 6,024,655 A | 2/2000 | Coffee |
| 6,037,869 A | 3/2000 | Lace |
| 6,100,615 A | 8/2000 | Birkestrand |
| 6,102,414 A | 8/2000 | Schweninger |
| 6,125,972 A | 10/2000 | French et al. |
| 6,127,927 A | 10/2000 | Durban et al. |
| 6,138,912 A | 10/2000 | Mitsuno |
| 6,161,849 A | 12/2000 | Schweninger |
| 6,173,817 B1 | 1/2001 | Gray |
| 6,181,253 B1 | 1/2001 | Eschenbach et al. |
| 6,187,471 B1 | 2/2001 | McDermott et al. |
| 6,204,772 B1 | 3/2001 | DeMay et al. |
| 6,217,398 B1 | 4/2001 | Davis |
| 6,232,884 B1 | 5/2001 | Gabbard |
| 6,353,388 B1 | 3/2002 | Durban et al. |
| 6,355,996 B1 | 3/2002 | Birkestrand |
| 6,362,728 B1 | 3/2002 | Lace et al. |
| 6,374,955 B1 | 4/2002 | Gray |
| 6,398,395 B1 | 6/2002 | Hyun |
| 6,424,115 B1 | 7/2002 | Holl |
| 6,446,005 B1 | 9/2002 | Bingeman et al. |
| 6,481,518 B1 | 11/2002 | Wu |
| 6,502,669 B1 | 1/2003 | Harris |
| 6,529,164 B1 | 3/2003 | Carter |
| 6,597,136 B2 | 7/2003 | Burton et al. |
| 6,650,242 B2 | 11/2003 | Clerk |
| 6,717,511 B2 | 4/2004 | Parker et al. |
| 6,739,675 B1 | 5/2004 | Scharpf et al. |
| 6,744,356 B2 | 6/2004 | Hamilton et al. |
| 6,774,503 B1 | 8/2004 | Chen |
| 6,784,800 B2 | 8/2004 | Orzechowski |
| 6,868,318 B1 | 3/2005 | Cawthorne et al. |
| 6,894,614 B2 | 5/2005 | Eckstein et al. |
| 6,911,908 B1 | 6/2005 | Beart |
| 6,928,343 B2 | 8/2005 | Cato |
| 6,945,366 B2 | 9/2005 | Taba |
| 6,971,464 B2 | 12/2005 | Marino et al. |
| 6,974,399 B2 | 12/2005 | Lo |
| 7,053,823 B2 | 5/2006 | Cervinka et al. |
| 7,061,749 B2 | 6/2006 | Liu et al. |
| 7,084,765 B2 | 8/2006 | Clapper |
| 7,087,029 B2 | 8/2006 | Friedland |
| 7,087,327 B2 | 8/2006 | Pearson |
| 7,183,910 B2 | 2/2007 | Alvarez et al. |
| 7,199,709 B2 | 4/2007 | Parsons |
| 7,218,225 B2 | 5/2007 | Wieth et al. |
| 7,239,965 B2 | 7/2007 | Wehrien et al. |
| 7,277,010 B2 | 10/2007 | Joao |
| 7,353,089 B1 | 4/2008 | McEvoy |
| 7,392,872 B2 | 7/2008 | Chiu et al. |
| 7,397,373 B2 | 7/2008 | Hunt |
| 7,420,301 B2 | 9/2008 | Veny et al. |
| 7,658,247 B2 | 2/2010 | Carter |
| 7,870,916 B2 | 1/2011 | Carter et al. |
| 7,944,368 B2 | 5/2011 | Carter et al. |
| 8,046,160 B2 | 10/2011 | Carter et al. |
| 2001/0008191 A1 | 7/2001 | Smith et al. |
| 2002/0167916 A1 | 11/2002 | Clapper |
| 2002/0175825 A1 | 11/2002 | Clerk et al. |
| 2002/0196151 A1 | 12/2002 | Troxler |
| 2003/0085064 A1 | 5/2003 | Turner |
| 2003/0102969 A1 | 6/2003 | Parsons |
| 2003/0206102 A1 | 11/2003 | Joao |
| 2004/0102896 A1 | 5/2004 | Thayer et al. |
| 2005/0027443 A1 | 2/2005 | Cato |
| 2005/0060069 A1 | 3/2005 | Breed et al. |
| 2005/0155824 A1 | 7/2005 | Taba |
| 2005/0259240 A1 | 11/2005 | Goren |
| 2005/0275513 A1 | 12/2005 | Grisham et al. |
| 2005/0279589 A1 | 12/2005 | Gray |
| 2006/0136303 A1 | 6/2006 | Bell et al. |
| 2006/0244588 A1 | 11/2006 | Hannah et al. |
| 2006/0247847 A1 | 11/2006 | Carter et al. |
| 2006/0249320 A1 | 11/2006 | Carter et al. |
| 2007/0045018 A1 | 3/2007 | Carter et al. |
| 2007/0045019 A1 | 3/2007 | Carter et al. |
| 2007/0104981 A1 | 5/2007 | Lam et al. |
| 2007/0225879 A1 | 9/2007 | French et al. |
| 2008/0066979 A1 | 3/2008 | Carter |
| 2008/0316059 A1 | 12/2008 | Hannah et al. |
| 2009/0002160 A1 | 1/2009 | Hannah et al. |
| 2009/0002172 A1 | 1/2009 | Hannah et al. |
| 2010/0148582 A1 | 6/2010 | Carter |
| 2011/0279252 A1 | 11/2011 | Carter et al. |
| 2012/0035823 A1 | 2/2012 | Carter et al. |

FOREIGN PATENT DOCUMENTS

| | | |
|---|---|---|
| WO | WO 98-44362 | 10/1998 |
| WO | WO 2004/031017 | 4/2004 |

(56) References Cited

FOREIGN PATENT DOCUMENTS

| WO | WO 2005-118992 | 12/2005 |
| WO | WO 2006-102300 | 9/2006 |
| WO | WO 2006-102561 | 9/2006 |
| WO | WO 2007-025267 | 3/2007 |
| WO | WO 2007-110571 | 10/2007 |
| WO | WO 2007-110572 | 10/2007 |
| WO | WO 2007-110573 | 10/2007 |
| WO | WO 2008-007050 | 1/2008 |

OTHER PUBLICATIONS

Press release titled "Gatekeeper Systems announces new product launch," Feb. 18, 2005.
International Search Report and Written Opinion for International Application No. PCT/US2006/033608, mailed May 21, 2008.
International Preliminary Report on Patentability for International Application No. PCT/US2006/033608, dated Apr. 9, 2009.
Office Action in corresponding Canadian Application No. 2620062, dated Jan. 21, 2013, 2 pages.

SYSTEMS AND METHODS FOR LOCATING AND CONTROLLING POWERED VEHICLES USING A RECEIVED STRENGTH INDICATION SIGNAL

RELATED APPLICATIONS

This application is a continuation of U.S. patent application Ser. No. 11/510,518, filed Aug. 25, 2006, titled "SYSTEMS AND METHODS FOR LOCATING AND CONTROLLING POWERED VEHICLES," which claims the benefit under 35 U.S.C. §119(e) of U.S. Provisional Application No. 60/711,135, filed Aug. 25, 2005, titled "MOBILITY CART CONTAINMENT SYSTEM AND METHODS," each of which is hereby incorporated by reference herein in its entirety.

BACKGROUND OF THE DISCLOSURE

1. Field

The present disclosure relates to systems and methods for determining the location and controlling the movement of powered vehicles, including but not limited to electric-powered, motorized carts.

2. Description of the Related Art

Retail stores may provide powered shopping carts for the convenience of their customers. For example, some powered shopping carts include a seat for a customer, a basket to hold retail goods, and a battery-powered electric motor system that allows the customer to travel within the retail store. Motorized shopping carts can be used in many commercial or retail environments. For example, motorized carts may be provided to make it easier for mobility-impaired customers to shop in a retail store or move in a shopping mall without the assistance of another person. In other cases, motorized shopping carts may have seats for children or carriers for babies, which makes it easier and safer for a parent or custodian to move in a retail environment.

Retail stores often permit powered shopping carts to travel freely within the store. However, stores may wish to restrict movement of carts into areas that are unsafe or inconvenient for cart retrieval and to deter theft and reduce other types of cart misuse. For example, a customer who drives a powered cart in a store parking lot may create a safety hazard for other customers and vehicles. Also, the customer may leave the cart at a location that blocks pedestrian access paths or vehicle parking spaces or at a location that makes cart retrieval inconvenient. Accordingly, a retail store may wish to implement a cart containment system that inhibits the ability of a powered cart to leave the store through an exit or to enter other restricted areas. The present disclosure provides examples of such a cart containment system.

This background section is not intended to suggest that the present disclosure is limited to powered shopping carts in a retail store environment or that the present disclosure is directed only to the types of cart misuse described above.

SUMMARY OF THE DISCLOSURE

An embodiment of a system for controlling movement of a personal mobility vehicle near a restricted region is disclosed. The system comprises a detector that is configured to be disposed on the personal mobility vehicle and that is configured to receive an electromagnetic signal transmitted to the restricted region. The system also comprises a control unit configured to communicate with the detector. The control unit is further configured to determine proximity of the detector to the restricted region using information related to the signal received by the detector. The control unit is also configured to provide a command to inhibit movement of the personal mobility vehicle in response to the determined proximity of the vehicle to the restricted region. In one embodiment, a personal mobility vehicle comprises the system.

Another embodiment of a system for localizing and controlling movement of a personal mobility vehicle is described. The system comprises a signal source configured to transmit a localization signal. The signal source is further configured to be disposed on a personal mobility vehicle. The system also comprises at least one detector configured to receive the localization signal and to determine a direction of the signal source relative to the detector. The system includes a control unit configured to communicate with the at least one detector and to determine a localization of the signal source relative to the at least one detector. The control unit is further configured to use the localization of the source to determine whether to provide a command to control a motor on the personal mobility vehicle. In one embodiment, a personal mobility vehicle comprises the system.

An embodiment of a processor-implemented method of inhibiting a personal mobility vehicle from entering a restricted region is disclosed. The method comprises determining a location of a personal mobility vehicle relative to a limit line near a restricted region and determining a direction of travel of the personal mobility vehicle relative to the limit line. The method further comprises making a decision, with a processor, whether to inhibit motion of the personal mobility vehicle into the restricted region. The processor is configured to use information related to at least one of the location and the direction of travel of the personal mobility vehicle. The method also comprises inhibiting motion of the personal mobility vehicle in response to the decision made with the processor.

In one aspect of the disclosure, a system for inhibiting a personal mobility vehicle from entering a restricted region comprises means for determining a location of a personal mobility vehicle relative to a limit line near a restricted region and means for determining a direction of travel of the personal mobility vehicle relative to the limit line. The system further comprises means for making a decision whether to inhibit motion of the personal mobility vehicle into the restricted region, the decision means using information related to at least one of the location and the direction of travel of the personal mobility vehicle and means for inhibiting motion of the personal mobility vehicle in response to the decision.

An embodiment of a processor-implemented method of controlling a personal mobility vehicle near a restricted region is described. The method comprises determining a first location of a personal mobility vehicle relative to a first limit line near a restricted region and determining a first direction of travel of the personal mobility vehicle relative to the first limit line. The method further comprises providing a warning if the first location and the first direction of travel indicate the personal mobility vehicle is approaching the restricted region. The method also comprises determining a second location of the personal mobility vehicle relative to a second limit line. The second limit line is closer to the restricted region than the first limit line. The method further comprises determining a second direction of travel of the personal mobility vehicle relative to the second limit line and inhibiting motion of the personal mobility vehicle if a processor determines, using at least one of the second location and the second direction of travel, that the personal mobility vehicle is approaching the restricted region.

In another aspect of the disclosure, a system for localizing and controlling movement of a personal mobility vehicle comprises a signal source configured to transmit a localization signal. The signal source is further configured to be disposed on a personal mobility vehicle. The system further comprises two detectors configured to receive the localization signal. The two detectors define a first limit line therebetween. The system also comprises a control unit configured to communicate with the two detectors and to determine a first localization of the signal source relative to the first limit and a second localization of the signal source relative to a second limit line.

In another aspect of the disclosure, a system for controlling a personal mobility vehicle near a restricted region comprises means for determining a first location of a personal mobility vehicle relative to a first limit line near a restricted region and means for determining a first direction of travel of the personal mobility vehicle relative to the first limit line. The system also comprises means for providing a warning if the first location and the first direction of travel indicate the personal mobility vehicle is approaching the restricted region. The system further comprises means for determining a second location of the personal mobility vehicle relative to a second limit line, where the second limit line is closer to the restricted region than the first limit line. The system also includes means for determining a second direction of travel of the personal mobility vehicle relative to the second limit line and means for determining, using at least one of the second location and the second direction of travel, whether the personal mobility vehicle is approaching the restricted region. The system also comprises means for inhibiting motion of the personal mobility vehicle, wherein the inhibiting means are configured to be actuated in response to the determination by the determining means.

Figure 1:
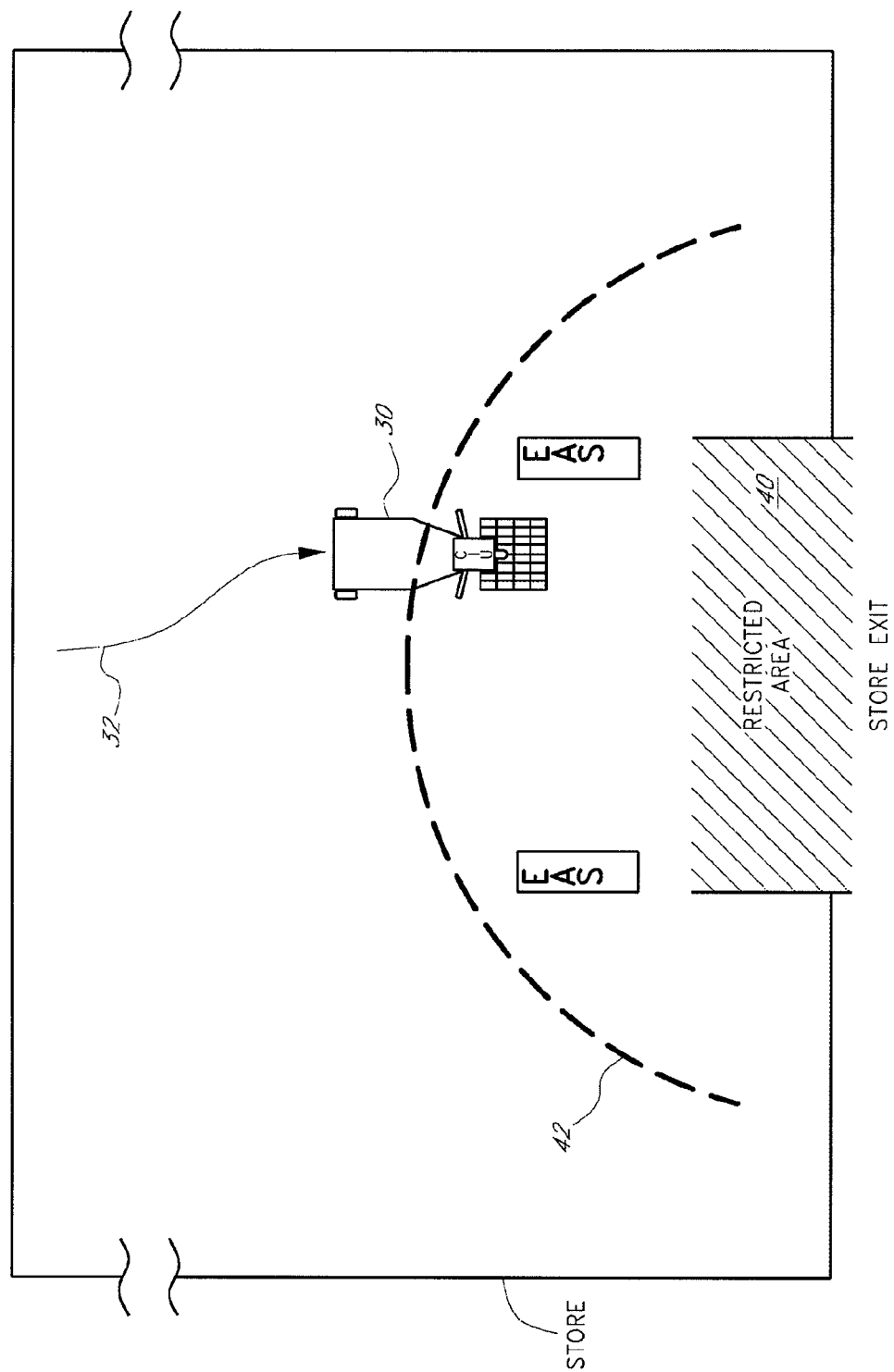
FIG. 1 schematically illustrates a retail store environment and various types of components that may be used in a cart containment system.

Reference symbols are used in the Figures to indicate certain components, features, and aspects shown therein, with reference symbols common to more than one Figure generally indicating like components, features, or aspects.

DETAILED DESCRIPTION OF PREFERRED EMBODIMENTS

I. Overview

Certain specific embodiments of the invention will now be described in detail with reference to the drawings listed above. These drawings and description of the disclosed embodiments are presented by way of example only, and do not limit the scope of the invention, which extends to alternative embodiments and uses of the invention and to obvious modifications and equivalents thereof. Thus, the scope of the invention is not to be limited to the preferred embodiments described below but is defined by the claims. For example, in any method or process described herein, the acts or operations of the method/process are not necessarily limited to any particular disclosed sequence. Also, for purposes of contrasting different embodiments or the prior art, certain aspects and advantages of these embodiments are described herein where appropriate. It should be understood that not necessarily all such aspects and advantages need be achieved in any one embodiment. Thus, it should be recognized that certain embodiments may be carried out in a manner that achieves or optimizes one advantage or group of advantages without necessarily achieving other aspects or advantages that may be taught or suggested herein.

For illustrative purposes only, the present disclosure will be described largely in the context of a retail store that implements a system and methods for locating and controlling powered shopping carts as they approach a store exit. It is recognized that the present disclosure is applicable to other contexts including, for example, tracking and/or containing carts in a warehouse, powered wheelchairs in a hospital, health care facility, or nursing home, baggage carts in an airport, golf carts at a golf course, or go-carts at a raceway. The system and methods described herein can be applied to inhibiting the movement of vehicles into a restricted area, which may be within or adjacent a store or other facility or which may be separated or remote from structures. In addition, the present disclosure is applicable to many types of powered vehicles including but not limited to powered single passenger and multi-passenger vehicles and cargo transports. Powered vehicles have a propulsion system such as a motor or an engine that is operable by a driver of the vehicle and may include other suitable operating devices such as a motor controller, throttle, steering system, etc. Powered vehicles may be operable in a forward direction and in a reverse direction. The present disclosure is applicable to vehicles powered by, for example, electrical energy or chemical energy, and the vehicles may utilize power from batteries, fuel cells, solar cells, stored energy cells, fossil fuels, or any other source of power. A powered vehicle may have two, three, four, or more wheels. Powered vehicles in the context of the present disclosure include but are not limited to electric vehicles, motor-driven shopping carts, electric carts, personal mobility vehicles, golf carts, industrial carts and cargo carriers, stock carts, baggage carts, hospital stretchers, and powered wheelchairs.

FIG. 1 schematically illustrates general features of one embodiment of a cart containment system. The cart containment system is shown as implemented in a retail store for purposes of locating and controlling movement of powered shopping carts 30 near a store exit. The cart containment system may be used with any type of powered vehicle including but not limited to powered mobility vehicles and motorized shopping carts as well as electric carts, cargo carts, golf carts, and powered wheelchairs. Typically, powered or motorized shopping carts carry a single passenger, who is the driver of the cart. However, powered or motorized shopping carts may carry multiple passengers, for example, the driver and passengers (e.g., one or more children). Single-passenger shopping carts typically include a seat for the driver, a basket on the front of the cart to hold merchandise and belongings, and are powered by an electric motor. The driver uses a throttle and steering system to control the speed and direction of travel of the cart. Powered shopping carts include, for example, battery-powered electric shopping carts such as the Mart Cart (Assembled Products Corp., Rogers, Ark.) or the SmartKART (Dane Industries, Brooklyn Park, Minn.). In the retail store context described herein, powered shopping carts may also include personal mobility vehicles including personal mobility carts configured to be operated by mobility-impaired drivers.

In the embodiment shown in FIG. 1, the containment system locates or otherwise identifies a cart 30 that is approaching a restricted area 40 adjacent the store exit. If the cart 30 crosses a stop line 42 and is moving toward the store exit, the containment system makes a decision whether to inhibit the motion of the cart 30. The stop line 42 preferably is located a distance away from the restricted area 40 to allow the cart 30 to smoothly decelerate to a stop before entering the restricted area 40. The containment system may communicate with the cart 30 through a Cart Interface Unit (CIU). In response to a containment signal from the system, the CIU may perform a range of actions to inhibit the motion of the cart 30. For example, the CIU may cut off power to the cart's motor, reduce the cart's throttle speed, or brake the cart's wheels. Further details of the CIU are described with reference to FIGS. 5A and 5B.

In the example shown in FIG. 1, the restricted area 40 is adjacent to and inside a store exit in order to contain carts within the store. However, in other implementations, the restricted area 40 can correspond to other locations near or within the store. For example, the restricted area 40 may correspond to a portion of a parking lot, and the stop line 42 may be positioned along a curb between the store exit and the parking lot. It is recognized that the cart containment systems and methods disclosed herein are applicable to a broad range of restricted areas including but not limited to restricted areas in or near stores, warehouses, healthcare centers, and parking structures as well as restricted areas located remote from other structures.

In some implementations, the containment system includes an external override system that permits a store employee to re-enable powered movement of the cart under certain circumstances. For example, after the cart has been stopped by the containment system, the override system may permit an authorized store employee to retrieve the cart and transport it back to the store under its own power.

There are several approaches by which a cart containment system can determine the general location of a cart 30 as it approaches a restricted area 40. In an "autonomous" approach, devices or components on or within the cart determine cart's location relative to the desired stop line and the CIU in the cart makes a decision whether (or not) to stop the cart. Autonomous systems may provide advantages including ease of installation in a store and the ability to retrofit a fleet of existing carts. In a "commanded" approach, devices or components external to the cart determine the cart's location and provide a command to the cart regarding whether (or not) to stop. Commanded systems may provide advantages including more accurately determinations of cart locations and the ability to manage more complicated store floorplans and containment constraints. Some embodiments of the cart confinement system combine aspects of both the autonomous and the commanded approaches. Detailed descriptions of examples of the autonomous and commanded approaches will now be provided.

As used in this disclosure, the term "location" refers to a general location or position of an object (e.g., a cart) relative to other components of the containment system. Generally, the location of the cart 30 refers to its location in a two-dimensional plane (e.g., a location within the plane of a store's floor). For example, the location of a cart 30 can, but need not, be specified by a two-dimensional coordinate position (e.g., Cartesian x- and y-coordinates). In some implementations, the location of the cart refers to proximity to a signal source (e.g., a transmitter or a marking line) or an angular bearing from a fixed object (e.g., a light beacon or a radio frequency angle-of-arrival detector). In other implementations, cart location may simply refer to whether the cart 30 is on one side, or the other, of a limit line. The containment system is not limited to two-dimensional location, and some embodiments may be configured to locate a cart in three dimensions. In the context disclosed herein, the term "localization" refers to determining a location of a cart 30 (or a component, feature, or reference point on the cart 30), where location has the meaning described above.

Certain embodiments of the cart containment system use information relating to the location of the cart 30 with respect to one or more limit lines (e.g., the stop line 42 in FIG. 1). Although in some embodiments the limit line is a relatively narrowly demarcated region (e.g., a narrow stripe of electrically conductive paint); in other embodiments, limit lines can relate to a more extended region near a store exit. For example, in some implementations, a transmitter mounted near the store exit transmits a signal (e.g., electromagnetic or acoustic) that is detected by a receiver on the cart 30. The strength of the signal typically increases as the cart 30 nears the transmitter, and the signal generally is detectable over a relatively extended region near the store exit. In such an implementation, the limit line may be defined to include positions where the received signal exceeds a particular threshold value. It is recognized that adopting a different threshold value will generally cause the position of the limit line to change correspondingly. Additionally, some embodiments of the system may define the location of a limit line using other information available to a receiver on the cart 30, such as, for example, a gradient of the received signal strength.

II. Autonomous Approach

1. Single Limit Line Systems

FIG. 1 schematically illustrates an embodiment of a cart containment system that uses an autonomous approach to determine the location of the cart 30 near the restricted area 40. As shown in FIG. 1, the cart 30 moves along a track 32 as the cart 30 approaches the stop line 42. The track 32 is an example of a path a customer might take to drive the cart 30 through the restricted area 40 and out of the store exit. The containment system can be configured to take actions to inhibit the motion of the cart 30 as it nears the restricted area 40. In this example, the containment system uses a single limit line (e.g., the stop line 42) to mark the vicinity of the restricted area 40. The stop line 42 is schematically illustrated in FIG. 1 as being curved; however, in other implementations the stop line 42 (or any other limit line) can have any suitable shape (e.g., substantially straight). Further details regarding methods used to demarcate limit lines are discussed below.

In the autonomous approach, the location of the stop line 42 can be marked by a variety of techniques so as to be detectable by the cart 30. A cart interface unit (CIU) is disposed on or within the cart 30 and includes electronic circuitry for detecting the presence of the stop line 42. Further details of an example CIU are discussed below with reference to FIGS. 5A and 5B.

As the cart 30 approaches the restricted area 40 along the track 32, the CIU detects the stop line 42 and issues one or more commands to slow down or stop the cart 30. In a preferred embodiment, the CIU issues a command to a motor controller to stop the cart's motor. Alternatively, the CIU can interrupt the electrical connection between the cart's electric battery and its motor controller, thereby causing the motor to stop. In other embodiments, the cart 30 may include a braking mechanism, and the CIU can issue a command to actuate the braking mechanism. For example, one or more wheels can be braked or locked as described in U.S. Pat. No. 6,362,728, ANTI-THEFT VEHICLE SYSTEM, which is hereby incorporated by reference herein in its entirety. Some embodiments of the CIU use a combination of these or other procedures to reduce the momentum of the cart 30.

It is preferred, but not necessary, that a smooth deceleration be used to stop the cart 30 in order to avoid injury to persons on or near the cart 30 and to prevent damage to the cart 30. Accordingly, as shown in FIG. 1, the stop line 42 preferably is located a short distance away from the restricted area 40 to allow the cart 30 to gradually slow down and stop before entering the restricted area 40. The distance will depend on the specifics of the cart (e.g., its mass and typical speed) as well as on how the cart is stopped (e.g., by turning off the motor, by braking, or by a combination of these methods).

Optionally, the CIU may issue a command to a warning system that provides an audible or visible warning that the cart 30 has crossed the stop line 42. For example, the warning system may include an alarm, siren, voice synthesis unit, and/or a visual indicator such as an LED indicator or a flashing light. The warning system may provide a warning to the cart driver to slow down and stop the cart. A warning system advantageously helps deter theft of the cart 30 and provides an audible or visible indication to store employees as to which cart has crossed the stop line 42 and been powered down or locked.

In some retail store environments, it may be undesirable to leave the cart 30 stopped in the restricted area 40; for example, a cart blocking a sidewalk may pose a safety hazard. Therefore, the system can allow for "no-stop" regions in which cart motion is permitted for safety reasons. For example, if the cart containment system is unsuccessful at stopping the cart before it enters a no-stop region, the system will not take further action to inhibit cart motion. In this case, the cart 30 is permitted to enter (and possibly exit) the no-stop region.

Some embodiments of the cart confinement system include an external override system that allows an authorized person, such as a store employee, to override the decision made by the CIU to stop the cart 30. For example, the override may include a device that communicates with the CIU and commands the CIU to provide power to the cart's motor system or to unlock the brake. Alternatively, the override may include a switch that turns off or otherwise modifies a marking signal that indicates the stop line 42.

In the autonomous approach, there are many methods for marking the position of the stop line 42. For example, in a first method, a stripe of electrically conductive material (e.g., a conductive paint) can be placed on the floor along the stop line 42. The CIU on a cart 30 can include two (or more) electrical contacts that drag along the floor. When the cart 30 crosses the stop line 42, the conductive stripe completes an electrical circuit between the two contacts which provides the signal to the CIU to stop the cart 30. In a second method, a floor mat that includes a flexible permanent magnetic material is placed along the stop line 42. The magnetic field produced by the mat is detected by a magnetic sensor in the CIU (e.g., a Hall-effect sensor), which stops the cart. Further details related to a magnetic marker that can produce a suitable stop line signal are described in U.S. patent application Ser. No. 11/277,027, filed Mar. 20, 2006, titled NAVIGATION SYSTEMS AND METHODS FOR WHEELED OBJECTS, hereinafter the "Navigation System Application," which is hereby incorporated by reference herein in its entirety.

However, these two methods suffer from some potential disadvantages. Both methods require the floor of the store to be modified, which may limit the ways the floor can be cleaned. Electrically conductive paint is susceptible to routine wear and requires periodic repainting. Ferromagnetic materials in a cart (e.g., a metal frame and the motor) can interfere with the magnetic field of a magnetic marker. Moreover, these two methods do not readily permit an external override system. For example, once the cart 30 has been stopped by the CIU (e.g., its motor is powered down and/or its wheels are locked), the cart 30 typically cannot be made operational again until a store employee drags the cart 30 back across the stop line 42 and then resets the CIU. Additionally, these methods generally may not be amenable to more complex constraint geometries used to indicate the location of the restricted area 40, e.g., those using multiple limit lines (see below with reference to FIG. 2). Accordingly, other methods that do not suffer from some of these potential disadvantages can be used to indicate the stop line 42.

Figure 2:
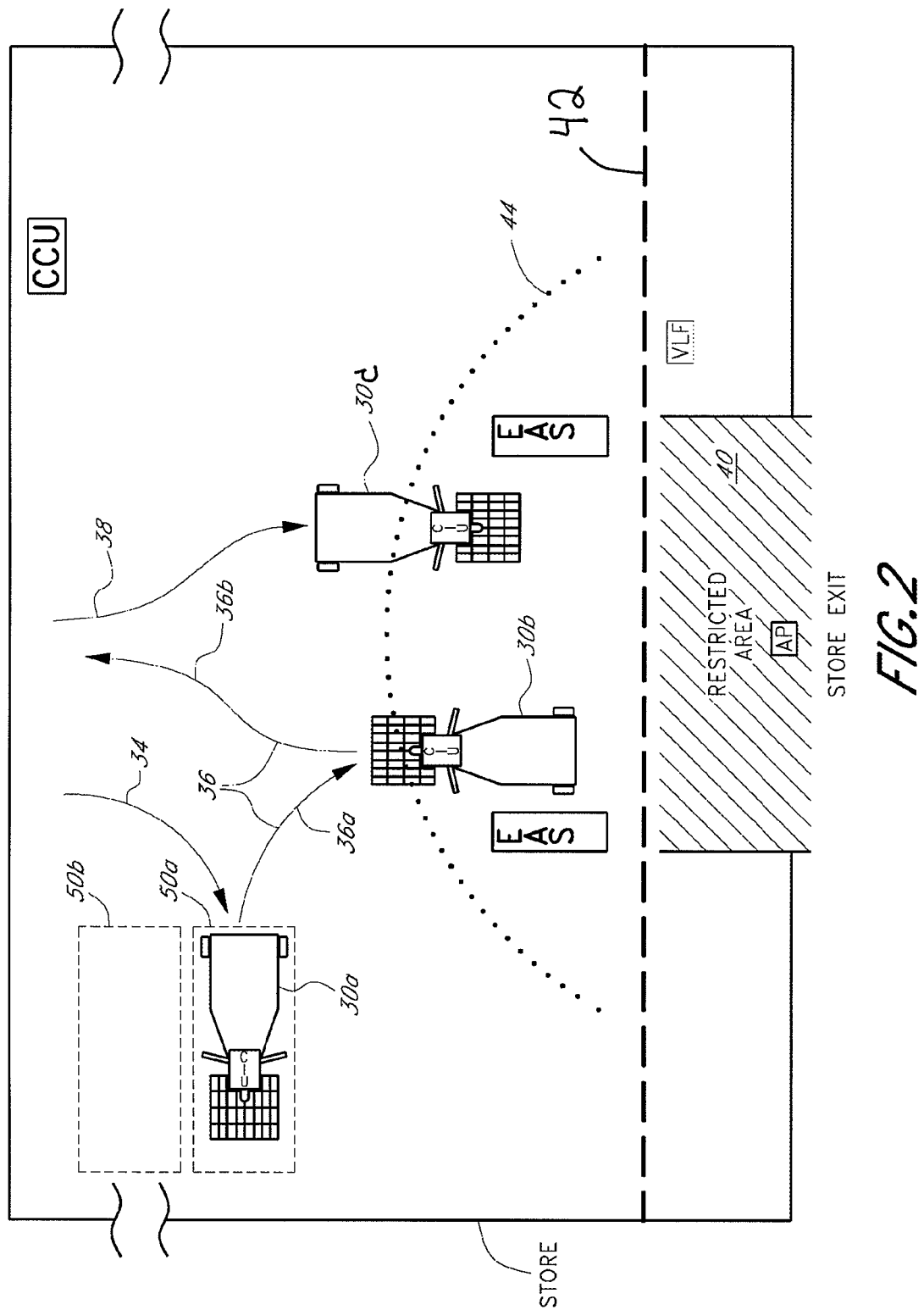
FIG. 2 schematically illustrates another retail store environment and various types of components that may be used in a cart containment system.

In one method, an electronic article surveillance (EAS) system is used as a location marker for the stop line 42. Many retail stores have EAS systems installed near store exits to prevent shoplifting. Generally, a physical barrier prevents carts (and customers) from exiting the store unless they pass between two EAS towers. Activated security tags are attached to store merchandise, and the EAS system will be triggered if the activated tag passes between the EAS towers. If the merchandise is purchased, the tag is deactivated by a store employee can pass between the EAS towers without triggering the EAS system. Pairs of towers are typically separated by about six feet, and multiple pairs of towers can be used to provide electronic surveillance for wider store exits. Many EAS towers transmit an electromagnetic signal that can be detected by an EAS receiver on a cart 30. The strength of the received EAS signal may be used to indicate the location of a limit line. For example, the cart 30 can include the EAS receiver in the CIU shown in FIGS. 5A and 5B (which will be more fully described hereafter. The CIU can determine if the cart 30 is crossing a limit line by measuring the strength of the EAS signal as the cart 30 approaches the EAS towers. In some implementations, the locus of points near the towers where the EAS signal is above a threshold detectable by the receiver is used to demarcate the stop line 42. The shape of the stop line 42 generally will be curved (as schematically depicted in FIGS. 1 and 2), because the strengths of the signals transmitted by the EAS towers generally are distance and direction dependent.

The EAS method takes advantage of the common presence of EAS towers at retail store exits and may not require installation of additional devices to mark the stop line 42. Additionally, EAS towers can be used to indicate multiple limit lines (as discussed below with reference to FIG. 2). One EAS system that is suitable for use with the containment systems disclosed herein is the Sensormatic® EAS system by Tyco International (US) Inc. (Princeton, N.J.). Other commercially available EAS systems may be used as well including radio frequency systems (operable at frequencies between about 2 MHz and 10 MHz), electromagnetic systems (operable at frequencies below about 1 kHz), and acousto-magnetic systems (operable at frequencies between about 50 kHz and 70 kHz).

In another method, a Very Low Frequency (VLF) marking system can be used to indicate the location of the stop line 42. In this method, a VLF signal line is embedded along the stop line 42 (e.g., under the floor). The cart 30 can include a VLF receiver (e.g., in the CIU) that is capable of detecting an electromagnetic signal transmitted on the VLF line to determine when the cart 30 crosses the stop line 42. Preferably, the VLF marking signal is coded so that different codes can be used to uniquely identify different limit lines. A VLF marking system suitable for use with the containment system disclosed herein includes the 8 kHz perimeter line in the $GS^2$ System produced by Gatekeeper Systems, Inc. (Irvine, Calif.).

Optical systems can be used to determine when the cart 30 crosses the stop line 42. For example, the cart 30 may include one or more cameras or other suitable optical detectors that image specific optical features near the store exit, and the CIU can include image processing capabilities to determine the proximity of the cart 30 to the imaged features. Suitable optical features for marking the stop line 42 include, for example, a line or pattern having specific color(s) or spectral reflectivity or absorptivity. The camera (or other optical detector) on the cart 30 can be pointed toward the floor to detect the features. Different limit lines can be identified by using different optical characteristics for each line or marking. Optical systems can utilize detectors capable of sensing ultraviolet, visible, infrared, or any other suitable portion of the electromagnetic spectrum.

In another optical method, optical beacons (e.g., retroreflectors or projected light spots) may be mounted in known locations (e.g., on the ceiling), and an optical sensor on the cart 30 can determine angles between the sensor and the beacons. The CIU can determine the position of the cart 30 from these angles using well-known methods of triangulation. An example of an optical triangulation system is the NorthStar® localization system by Evolution Robotics, Inc. (Pasadena, Calif.).

External override systems may be readily implemented with either EAS or VLF limit line marking methods. For example, the override system can include a switch unit (e.g., a wall-mounted key switch operable by store employees) that turns off or otherwise modifies the signal transmitted by a VLF line or an EAS pedestal. The absence of a marking signal at the stop line 42 may indicate that the cart 30 is authorized to travel into (or through) the restricted area 40. If the CIU on the cart 30 detects a modified signal, the CIU may perform an action that is modified from its default behavior such as, for example, doing nothing or just actuating a warning system. Also, as described above, an external device (e.g., a handheld mobile control unit carried by a store employee) can be used to communicate with the CIU and direct that cart power be re-enabled.

Some embodiments of the cart containment system may utilize a combination of the above methods. For example, EAS towers may be used at store exits, while a buried VLF line may be used in a parking lot. In this case, the CIU on a cart 30 may include both an EAS and a VLF receiver. Alternatively, the CIU may use information from the EAS and/or VLF signals to determine a suitable action to perform. For example, the probability of cart theft at a store exit might be low, and upon detecting an EAS signal at the exit, the CIU may simply cut power to the cart motor, which can coast to a stop. The customer using the cart can remove his or her goods, and the store can readily retrieve the cart. However, the probability of cart theft at the perimeter of a store parking lot may be higher. Accordingly, upon detecting a signal from a VLF line embedded at the perimeter, the CIU may cut power to the cart motor and lock one or more wheels on the cart to prevent theft of the cart. Many scenarios are possible and the decision logic used by a cart CIU can be specified to suit the scenario.

In other implementations, methods discussed below for cart localization may alternatively or additionally be used. For example, instead of using EAS towers, the system can use one or more wireless access points (APs) to transmit a signal (e.g., a 2.4 GHz signal) to indicate the location of the stop line 42.

Single limit line systems provide benefits such as simple installation (e.g., they may use preexisting EAS or VLF markers) and ease of use (e.g., simple CIU decision logic). However, single limit line systems suffer from a potential drawback of not being able to support more complex store geometries or handle more complicated decision logic dealing with a variety of possible cart tracks.

2. Multiple Limit Line Systems

FIG. 2 schematically illustrates an example of a cart containment system that uses two limit lines; however, this is not a limitation of the system, and more limit lines can be used in other embodiments. The limit lines illustrated in FIG. 2 include a stop line 42 and a caution line 44 placed near a restricted area 40 at a store exit. The limit lines 42 and 44 can be marked by one or more of the methods described herein. For example, the limit lines 42 and 44 can be marked by EAS or VLF transmitters or magnetic markers or conductive stripes. For illustrative purposes only, FIG. 2 indicates the stop line 42 is marked with a pair of EAS pedestals while the caution line 44 is marked with a VLF signal line; however, any of the marking methods described herein can be used in other implementations. Also, as described above, limit lines can be placed at additional or different locations in or near the store (e.g., in a parking lot).

In the embodiment shown in FIG. 2, the cart containment system uses information related to the location of a cart 30 relative to the two (or more) limit lines and the cart's direction of travel (and/or speed) to make a determination whether to, for example, inhibit cart motion, actuate a warning system, or take some other suitable action, either alone or in combination. In making this determination, the cart containment system may utilize information from the cart's motor controller and/or steering controller to determine, for example, whether the cart 30 is being operated in forward or reverse, its turning direction and likely path, and/or its speed. The containment system may also use other information as well, such as whether the front or the back of the cart 30 is crossing a limit line. Although the examples described herein are largely in the context of preventing cart motion into a restricted area, in other implementations the cart containment system may be configured to perform additional or different actions such as, for example, limiting the speed or the direction of travel of a cart. In other cases, the system may simply detect the location of the cart and communicate information related to the detection to another processing system. Many variations are possible.

In the example shown in FIG. 2, the store optionally provides cart charging spots 50a and 50b that can be used to park carts and to recharge their batteries when not in use. Two charging spots 50a, 50b are depicted, however fewer or more spots can be used. The cart charging spots 50a, 50b are not an element of the cart containment system (and are not required for its use) but are included in the example in FIG. 2 to illustrate the type and variety of cart movements that occur in a retail store environment and that the containment system can be configured to handle.

FIG. 2 schematically illustrates three possible tracks 34, 36, and 38 that a cart 30 might take near the store exit. The tracks 34 and 36 are examples of permitted cart paths, while the track 38 is an example of a prohibited cart path. The cart containment system may be configured to inhibit the movement of a cart 30 traveling on a prohibited path, while taking no (or limited) action for carts on permitted paths. The three tracks 34, 36, and 38 shown in FIG. 2 are intended to be representative of typical cart paths near a store exit and are not intended to be limitations on the types of cart movement that the cart containment system can handle. The cart containment system can be configured to be responsive to the specific types of cart paths found in any particular store or facility.

The track 34 is an example of a permitted path near the store exit. A customer drives a cart 30a into one of the available charging spots 50a. In this example, the cart 30a is in the charging spot 50a nearest the store exit, which is as close to the restricted area 40 as the store permits. The caution line 44 may be placed just exit-ward of the charging spot 50a as shown in FIG. 2.

The track 36 (with portions 36a and 36b) is an example of a customer driving a cart 30b in reverse along the portion 36a to back out of the charging spot 50a and then driving the cart 30b forward along the portion 36b to enter the store. The track 36 is an example of a "y"-turn and is a permitted path for store entry. The cart 30b depicted in FIG. 2 may be the cart 30a or another cart parked near the store exit (e.g., a cart parked in charging spot 50b). In making the "y"-turn along the portion 36a, the cart 30b crosses the caution line 44 in reverse. The cart containment system can be configured to allow such reverse motion of the cart 30b unless the track 36a crosses the stop line 42. In this case, the containment system may, for example, inhibit cart motion to prevent the cart 30b from being driven out of the store in reverse. Accordingly, the caution line 44 should be placed a short distance from the stop line 42, about one to two cart lengths in some embodiments, to permit such "y"-turns. The portion 36b wherein the cart 30b travels forward across the caution line 44 is a permitted path, and the containment system generally will take no further action in this case.

The track 38 is generally similar to the track 32 shown in FIG. 1 and depicts a customer attempting to drive a cart 30c out of the store exit. The cart containment system may be configured to inhibit or prevent movement of the cart 30c into the restricted area 40 along the prohibited track 38. In embodiments having a warning system, the containment system may actuate the warning system when the cart 30c crosses the caution line 44. For example, the warning system may provide a warning signal, alarm, or synthesized (or recorded) voice warning the customer to slow down and stop. If the customer ignores or is unable to respond to the warning and the cart 30c crosses the stop line 42, the containment system can then inhibit cart motion by, for example, cutting motor power, throttling cart speed, or applying a brake. Accordingly, the caution line 44 preferably is placed a short distance away from the stop line 42 to permit the customer to respond to the warning.

The cart containment system can include other features. For example, one embodiment may provide for a time lag between when the cart 30 crosses the stop line 42 and when the cart motion is inhibited by the CIU. This time lag permits a customer to drive the cart 30 back into the store (e.g., somewhere on the store side of the stop line 42 or the caution line 44) before the CIU inhibits the cart's movement. In some implementations of the containment system, the store may post notifications, instructions, and/or use guidelines regarding the containment system to alert customers to the presence of the system and possible consequences of not appropriately using the carts.

The cart containment system may communicate with other devices on or off the cart 30. For example, the system may transmit a signal to a central control unit (CCU) located in the store that stores and processes information related to movement of carts across the limit lines. The system may communicate with an output device on the cart (e.g., a display screen or voice synthesis unit). For example, the containment system may provide the warnings described above or other notifications (e.g., the time until the CIU stops the cart) on the output device. In other embodiments, the containment system may provide a greeting or other information (e.g., regarding sales or special offers) to a customer that is entering the store along a permitted path (e.g., track 36). Many other variations are possible, and further details regarding systems for tracking movement and status of vehicles can be found in U.S. patent application Ser. No. 11/277,016, filed Mar. 20, 2006, published as U.S. Patent Application Publication No. 2006/0244588, titled TWO-WAY COMMUNICATION SYSTEM FOR TRACKING LOCATIONS AND STATUSES OF WHEELED VEHICLES, (hereinafter, the "Two-Way Communication Application"), which is hereby incorporated by reference herein in its entirety.

As discussed in the Two-Way Communication Application, the access points preferably use both unicast (target-specific) and multi-cast addressing to send messages to the cart transceivers. An example of a multi-cast message is a message addressed to "all cart transceivers that are locked," or "all cart transceivers of carts that are moving." Because multiple cart transceivers can respond to a multicast transmission, the response window is divided into multiple response slots, and the cart transceivers pseudo-randomly select between the available response slots. The access point acknowledges the responses it receives, enabling the cart transceivers to detect and retry unsuccessful responses (e.g., those that produced collisions).

As also discussed in the Two-Way Communication Application, in an example of a communications protocol that may be used for communications between access points and shopping carts, the access point (AP) initially sends a sequence of wakeup packets. Each wakeup packet includes the following: (1) a synchronization pattern, (2) a source address (i.e., the unique address of the transmitting access point), (3) a destination address (e.g., "all carts," "all carts in category X," or "cart 12345"), (4) a command, (5) an RSSI threshold (i.e., a minimum RSSI value that needs to be detected by the cart transceiver for the cart transceiver to respond), (6) a window begin time indicating a length of time before the response window begins, (7) the size of the response window, (8) the number of slots in the response window, and (9) a CRC value.

In one embodiment, the RSSI threshold refers to a filtered RSSI value, so that a cart transceiver will not respond to an AP when the cart transceiver is not in the AP's antenna footprint or zone, even if anomalous RF propagation causes a single RSSI measurement to be anomalously high. A cart transceiver (CT) may generate a filtered RSSI value for a given AP from wakeup-packet-specific RSSI values generated by the CT during the wakeup sequence, and/or from RSSI values generated from recent transmissions of the AP.

III. Commanded Approach

Figure 3:
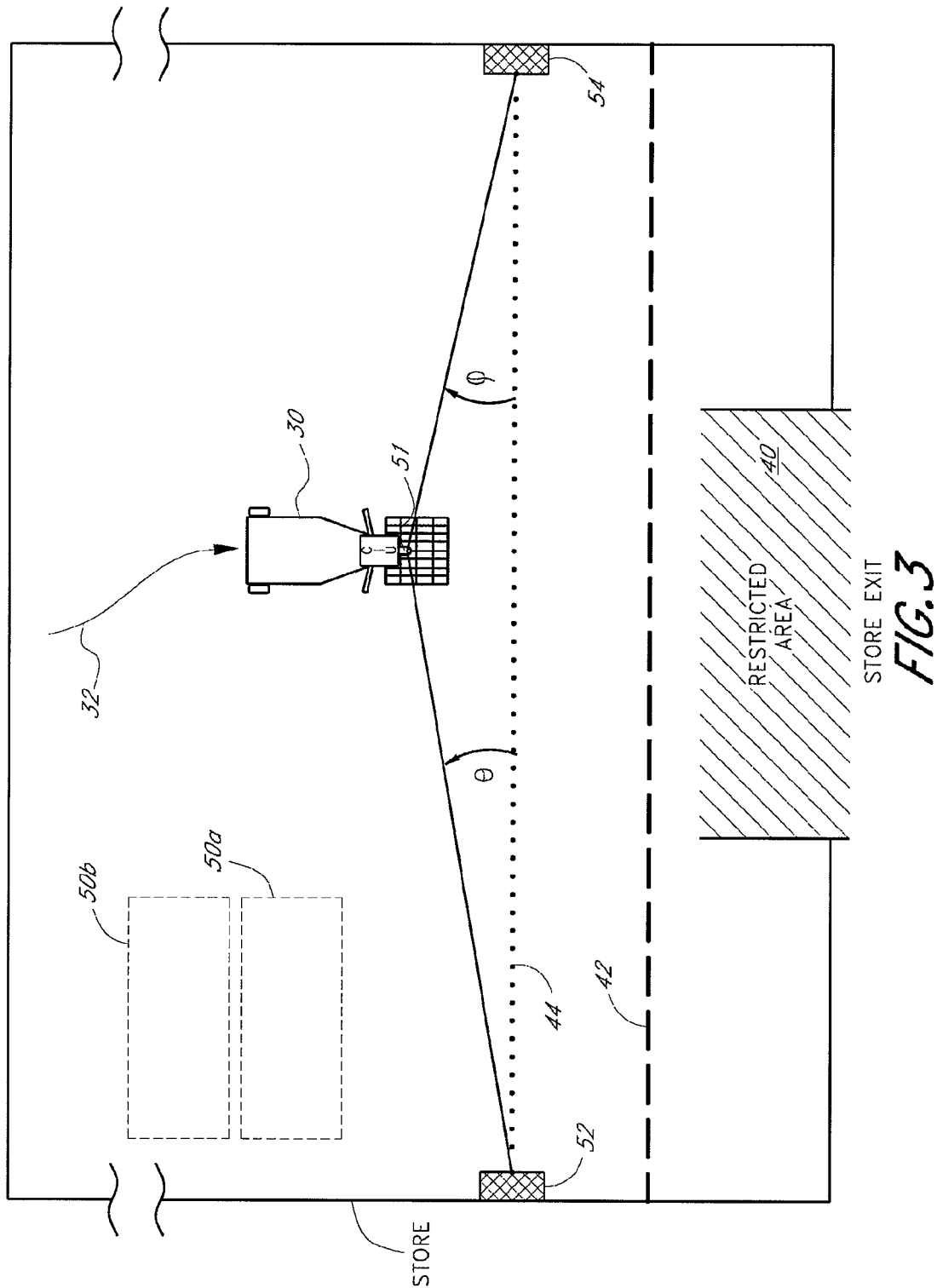
FIG. 3 schematically illustrates a retail store environment including radio frequency angle of arrival detectors for localization of a cart.

Certain preferred embodiments of the cart containment system use a "commanded" approach for determining the location of the cart and providing commands to the CIU. FIG. 3 schematically illustrates a retail store that implements a commanded cart containment system. Some of the features shown in FIG. 3 have already been described with reference to FIGS. 1 and 2 and will not be further discussed except where there are differences. The cart containment system utilizes two limit lines, the stop line 42 and the caution line 44; however, other systems may utilize fewer or more limit lines.

In the commanded approach, one or more external components (described below) are used to measure the location of the cart 30 in order to determine the cart's location relative to at least one of the limit lines 42, 44. In some commanded systems, an optional external processor, such as a central control unit (CCU) installed in the store, uses information including the cart's relative position to decide, for example, whether to inhibit or permit further cart motion. The CCU communicates this decision (or command) to a CIU on the cart (e.g., via wireless transmission), and the CIU performs the appropriate action (e.g., cutting power to the motor). In other commanded systems, the external components used to determine the cart's location communicate location information to the CIU (e.g., via wireless transmissions), and the CIU implements decision logic to determine whether to take any action. Such systems are advantageous if communication between the CIU and external components is not always reliable. For example, if communications are interrupted, the CIU can use its most current location information from the external components as a starting point for a dead reckoning navigation system to determine its subsequent location. Further details of a dead reckoning navigation are found in the above-incorporated navigation system application.

Alternately, some commanded systems may combine aspects of the above systems, for example, by sharing the decision logic among the CIU, the CCU, and the external location components. Some commanded systems may implement several of the above systems (e.g., a CCU-based system as the default with a CIU-based system as a fall back in the event that communications from the CCU are interrupted).

A wide variety of electromagnetic, optical, and acoustic components can be used to determine the location of the cart 30. Several preferred systems and methods for cart localization will now be described. However, it is contemplated that any suitable location measuring system can be used with the cart containment system.

1. Angle-of-Arrival Detectors

In the example shown in FIG. 3, the location of the cart 30 is determined with reference to two angle-of-arrival detectors 52 and 54. The cart 30 includes a radio frequency (RF) transmitter (or transceiver) 51 that transmits an RF signal. The transmitter may be included in the CIU or positioned elsewhere on the cart. For example, as shown in FIG. 3 the RF transmitter 51 may be positioned at the front of the cart. Preferably, the RF transmitter is positioned on the cart 30 several feet above the floor of the store so that the RF path to the detectors 52, 54 (which can be wall-mounted about nine to twelve feet above the floor) is relatively unimpeded. The angle-of-arrival detectors 52 and 54 detect the RF signal from the transmitter 51, and each detector determines a transmission angle with respect to a reference direction. As shown in FIG. 3, the detectors 52 and 54 preferably are mounted at opposite ends of one of the limit lines (e.g., the caution line 44 in FIG. 3), which conveniently serves as the reference direction. Accordingly, the detector 52 can determine an angle θ made by the cart 30 with respect to the caution line 44, and the detector 54 can measure a corresponding angle φ as shown in FIG. 3. The location of the cart 30 relative to the caution line 44 can be determined using standard trigonometric techniques. For example, the perpendicular distance between the cart 30 and the caution line 44 is $$L\left(\frac{\tan\theta\tan\varphi}{\tan\theta + \tan\varphi}\right), \quad (1)$$

where L is the distance between the detectors 52 and 54. Additionally, the movement of the cart 30 relative to the caution line 44 can be determined by measuring the change in the angles θ and φ with respect to time.

The location of the cart 30 relative to the stop line 42 can also be determined by adding the distance between the caution line 44 and the stop line 42 to the perpendicular distance given in Equation (1). Similar considerations apply if there are more than two limit lines. Accordingly, an advantage of this embodiment is that a pair of angle-of-arrival detectors 52 and 54 can be used to localize the cart 30 with respect to multiple limit lines.

Alternatively, in other implementations, additional angle-of-arrival detectors may be mounted at the ends of other limit lines. Further, other limit line marking methods as described herein can be used to identify the other limit lines.

Figure 4:
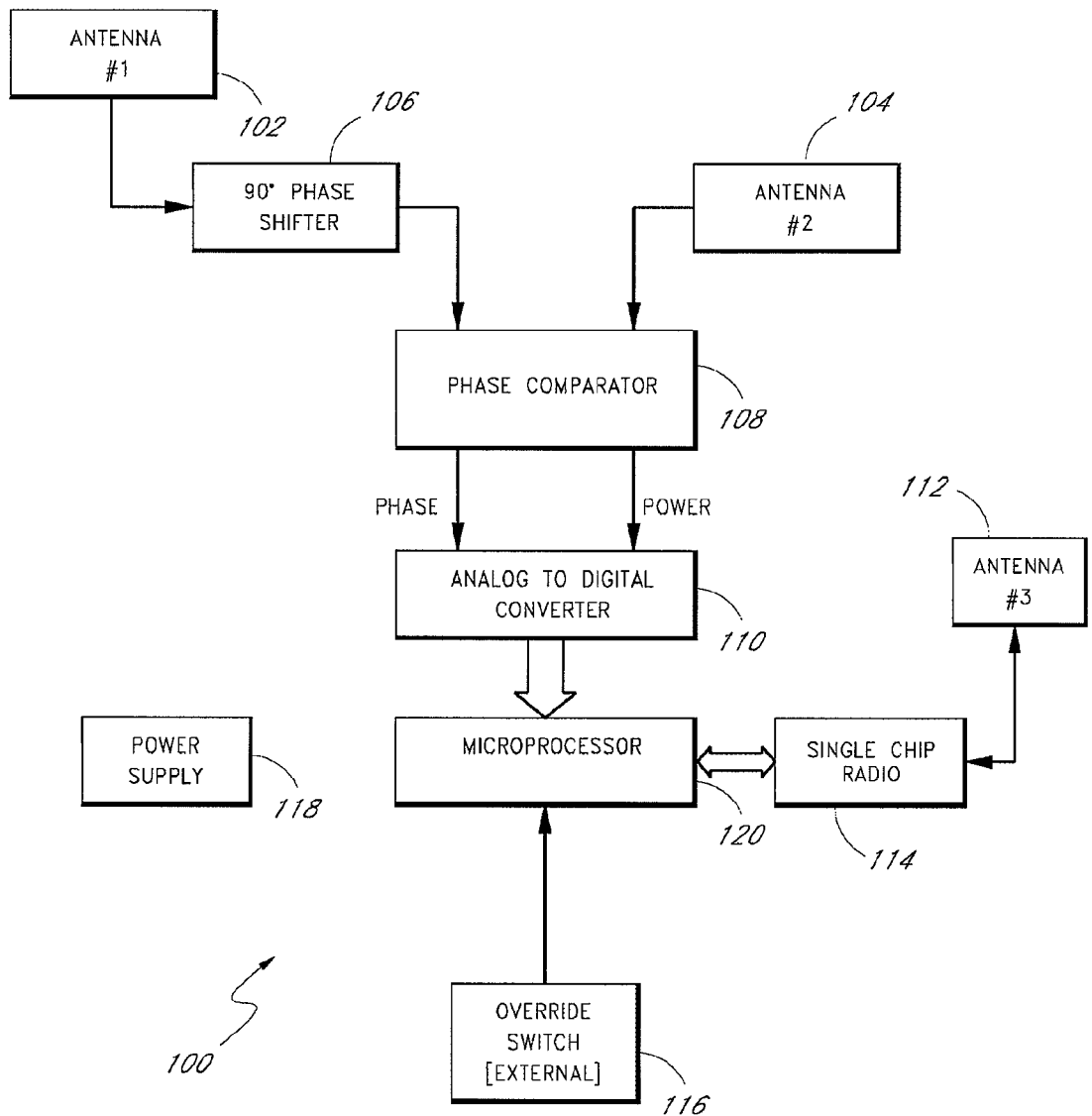
FIG. 4 is a block diagram of electronics that can be used in a phase difference based angle-of-arrival detector.

FIG. 4 is a block diagram that illustrates electronic circuitry in an embodiment of an angle-of-arrival detector 100. The angle-of-arrival detectors 52 and 54 shown in FIG. 3 may be substantially similar to the detector 100. The detector 100 comprises antennas 102 and 104 that are configured to receive a signal transmission from an RF transmitter (or transceiver) disposed on a cart (e.g., the RF transmitter 51 shown in FIG. 3). The RF signal transmission is received substantially simultaneously by the antennas 102 and 104, which communicate corresponding received signals to a phase comparator 108. The phase comparator 108 measures a difference in phase ΔΦ between the two received signals. An AD8302 RF/IF Gain and Phase Detector by Analog Devices (Norwood, Mass.), which is operable at RF frequencies up to 2.7 GHz, is suitable for use as the phase comparator 108.

This phase difference between the signals received by the antennas 102 and 104 typically is relatively small, especially as the cart nears the limit line. In some embodiments, the phase comparator 108 is more accurate at detecting phase differences of about ninety degrees. Accordingly, a ninety-degree phase shifter 106 may optionally be inserted into the detector circuit 100 so that the phase comparator 108 can provide more accurate phase difference measurements. For example, FIG. 4 shows that the phase shifter 106 introduces a ninety degree phase shift into the signal from the antenna 102 relative to the signal from antenna 104.

The phase difference ΔΦ measured by the phase comparator 108 is linearly related to the path difference Δs from the source antenna 51 to the two receive antennas 102 and 104. For example, the path difference Δs is the difference between the distance from the antenna 51 to the antenna 102 and the distance from the antenna 51 to the antenna 104. The phase difference is determined from $\Delta\Phi = 2\pi\Delta s/\lambda$, where λ is the wavelength of the carrier signal. A given phase difference ΔΦ can be mathematically described as a hyperbola on which the source 51 is located. When the distance between the source antenna 51 and receive antennas 102 and 104 is long relative to the distance between the receive antennas 102 and 104, the hyperbola can be replaced by two asymptotic lines. For example, the asymptotic lines corresponding to the angle-of-arrival detector 52 shown in FIG. 3 have slopes related to $+\theta$ and $-\theta$. The ambiguity between $+\theta$ and $-\theta$ may be resolved by multiple techniques. For example, if from throttle position and direction of travel the cart 30 is known to be moving toward the exit, and if $|\theta|$ is decreasing in time, then $\theta$ as shown in FIG. 3 is positive.

Phase (and optionally RF power) measurements from the phase comparator 108 are digitized by an analog-to-digital converter 110 and communicated to a microprocessor 120. A power supply 118 provides power to the detector circuit 100. In certain embodiments, the signal transmission from the cart is preceded by a modulated digital transmission that is received by a single chip radio 114 via an antenna 112. The modulated digital transmission indicates to the microprocessor 120 when to instruct the analog-to-digital converter 110 to digitize the phase output of the phase comparator 108. A CC2500 2.4 GHz RF transceiver available from Texas Instruments (Dallas, Tex.) can be used as the radio 114.

The angle-of-arrival detector 100 can determine whether the cart is near the limit line (e.g., the angles $\theta$ and $\phi$ shown in FIG. 3 are approximately zero) from the fact that the phase difference between the signals received at the antennas 102 and 104 is approximately zero, independent of the frequency. Accordingly, the angle-of-arrival detector 100 advantageously can accurately detect the angular bearing of the cart 30 relative to the limit line, even as the cart 30 crosses the limit line.

Some embodiments of the angle-of-arrival detector 100 include an external override switch 116 that can be used to, for example, cut power to or modify the decision logic of the microprocessor 120.

In some implementations, angle-of-arrival detectors can be placed at other locations in or around the store. For example, a single angle-of-arrival detector can be used to localize the position of a cart 30 that is moving in a relatively confined area such as, for example, an aisle or checkout lane in the store. The angle-of-arrival detector determines an angular bearing of the cart 30 within the confined space, and the geometrical constraints of the confined space permit a system to localize the cart along this angular bearing.

2. Received Signal Strength Indication (RSSI) Detectors

The cart 30 may be localized using a variety of received signal strength indication (RSSI) methods. In general, RSSI methods utilize transmitters (or transceivers) placed near the desired location of a limit line. A receiver (or transceiver) on a cart detects the transmitted signal and generates an RSSI value. Since the RSSI value is a maximum at the distance of closest approach to the transmitter, the CIU (or a remote processor such as the CCU) can localize the cart based on the RSSI value. In some implementations, directionally dependent transmitter antennas are used. In such implementations, the cart may be localized in both direction and bearing from the RSSI transmitter.

Each cart transceiver (CT) is preferably capable of measuring the received signal strength, in terms of an RSSI (received signal strength indication) value, of the transmissions it receives on the wireless tracking network. The system may use these RSSI measurements in various ways. For example, a cart transceiver may compare the RSSI value of an access point's transmission to a threshold value to determine whether to respond to the transmission. The cart transceiver may also report this RSSI value to the access point (together with the cart transceiver's unique ID) to enable the system to estimate the location of, or distance to, the shopping cart. As another example, the cart transceivers may be programmed to generate and report RSSI values of transmissions from other nearby cart transceivers; this information may in turn be used to estimate the number of carts that are queued at a checkout lane, in a cart storage structure, in a cart stack being retrieved with a mechanized cart retrieval unit, or elsewhere.

One RSSI localization method determines the proximity of a cart to a single transmission source. A variety of transmission sources can be used. For example, a wireless access point (AP) placed near the store exit (as shown in FIG. 2) can transmit a 2.4 GHz signal to be received by an antenna on the cart 30. An example of a suitable wireless access point is described in the Two-Way Communication Application (see, e.g., the text describing FIG. 10). In another example, the proximity of the cart is measured with respect to a shopping cart containment line which transmits a marking signal, such as a VLF signal. One example of a shopping cart containment line is the 8 kHz perimeter line in the $GS^2$ System produced by Gatekeeper Systems, Inc. (Irvine, Calif.). Alternatively, an EAS tower (commonly present in retail stores) can be used as the source of the signal for RSSI measurement.

Other RSSI localization methods utilize measurement of multiple RSSI values from spatially distinct signal sources. In one example, multiple EAS towers are used (e.g., the towers shown in FIGS. 1 and 2). For example, many retail stores have pairs of EAS towers placed near store exits/entrances. Generally, a physical barrier prevents carts (and customers) from exiting except between two towers. An EAS interrogation signal is generated alternately from each tower. In an example RSSI localization method, an EAS receiver on the cart measures an RSSI value from each of the two towers. By comparing the measured RSSI values, the CIU can localize the cart relative to the towers. In some cases, the CIU uses the RSSI values to calculate an estimated distance from the towers; however, in other cases, the CIU uses a threshold technique. For example, if each of the RSSI values is below a threshold value, the cart is sufficiently far from the towers, and the CIU does not need to implement methods to inhibit cart movement.

3. Optical Detectors

Optical detectors including but not limited to ultraviolet, visible, and infrared detectors can be used with cart localization systems. A cart 30 may be localized using optical techniques, including any of the optical methods described above for autonomous localization approaches. In another method, cameras (or other suitable optical detectors) are placed at locations near the store exit (e.g., mounted on walls or the ceiling) and are used to image the cart. Image visualization software can localize the cart by processing the camera images as is known in the art. In some cases, the cameras image specific features or portions of the cart. To enhance the accuracy and detectability achieved with this optical recognition method, additional features (e.g., reflective elements) can be added to the cart 30.

4. Acoustic Detectors

Acoustic localization is used in some implementations of the cart containment system. Acoustic localization systems can use detectors configured to sense acoustic signals having any suitable acoustic frequency including, for example, ultrasonic frequencies. For example, in one implementation, an ultrasonic transmitter is disposed on the cart 30 and configured to emit an ultrasonic signal, such as a chirp. Ultrasonic detectors (or receivers) are positioned near the store exit and used to detect the ultrasonic signal. The cart 30 can be localized using well-known time-of-flight triangulation methods.

5. Cart Orientation

The above-described approaches can be used to localize a reference point on the cart 30. For example, the reference point may be the RF signal transmitter (shown in FIG. 3) in angle-of-arrival based approaches, or the receiving antenna in RSSI based approaches.

In some embodiments of the cart containment system, an orientation of the cart is determined by localizing the position of the front of the cart relative to the position of the back of the cart. In these embodiments, any of the above-described localization approaches can be used to localize reference points on the front and back of the cart. In some localization methods, a two-dimensional coordinate position can be determined for each reference point, and the orientation may be determined as a relative displacement vector from the back reference point to the front reference point. In other localization methods, the proximity of a reference point to a signal transmitter is determined (e.g., an EAS tower or VLF line). In these methods, orientation information includes a determination of whether the front (or back) of the cart is closer to the signal transmitter.

In certain embodiments, two (or more) sensors mounted on the cart that have different angular directional characteristics can be used to determine the cart orientation. For example, in an RSSI approach, two antennas having different directional antenna patterns can be used. In one embodiment, which is described further below with reference to FIG. 5B, an omnidirectional antenna and a directional antenna are mounted on the cart and configured to communicate with the CIU. Comparison of RSSI values measured by each antenna can be used to calculate cart orientation.

It is to be understood that implementations of the cart containment system may use one, some, or all of the above-described methods and apparatus to determine cart localization. The choice of localization methods and apparatus will depend, for example, on budget constraints, whether an existing fleet of carts must be retrofit with CIU and antennas, the desired accuracy of the localization, the layout of the facility near restricted areas, and many other particular implementation-dependent details.

IV. Cart Interface Unit (CIU)

As described above, the CIU is disposed in or on the cart 30 and includes electronic circuitry to, for example, reduce or cut power to the cart motor, apply a wheel brake or lock, or actuate a warning system. The CIU may be a separate unit originally installed or retrofitted into a cart, or its functions and components may be distributed in circuitry throughout the cart.

Figure 5A:
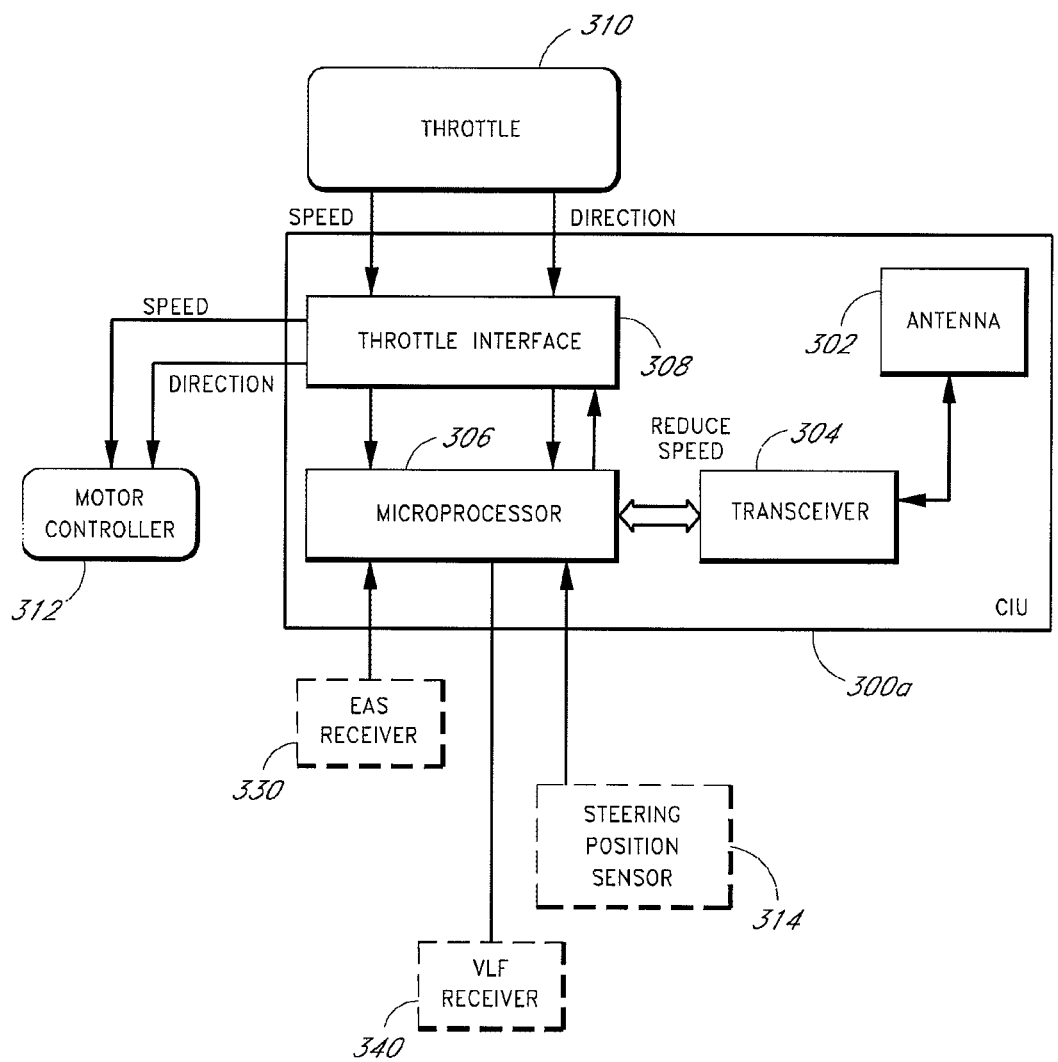
FIG. 5A is a block diagram of an example of a cart interface unit (CIU).

FIG. 5A schematically illustrates one embodiment of a CIU 300a that includes an antenna 302 and a transceiver (or receiver) 304 used to receive signals from external components such as angle-of-arrival detectors 52, 54, 100 and/or an optional CCU installed in the store. The antenna 302 preferably is an omnidirectional antenna such as, for example, an S151AM-2450S collinear dipole antenna available from Nearson, Inc. (Springfield, Va.). The antenna 302 can be disposed in the CIU 300a; however, in other embodiments, the antenna 302 is disposed elsewhere on the cart 30 to provide better sensitivity (e.g., on a light pole extending above the cart's frame). A CC2500 2.4 GHz RF transceiver available from Texas Instruments (Dallas, Tex.) can be used as the transceiver 304. Signals from the transceiver 304 are communicated to a microprocessor 306. In some embodiments, the functions of the transceiver 304 and the microprocessor 306 are combined in a single component such as, for example, a Chipcon CC2510 radio transceiver/microcontroller. The CIU 300a may also have an optional EAS receiver (or transceiver) 330 to detect signals from EAS towers. Additionally, the CIU 300a may include an optional VLF receiver 340, which preferably is positioned outside the CIU 300a and underneath the cart chassis to better detect signals from buried VLF lines.

The microprocessor 306 communicates with a throttle interface 308, which receives speed and direction information (e.g., forward or reverse) from a throttle 310. A driver of the cart 30 can also access the throttle 310 in order to give ordinary driving instructions to the cart's motor controller 312. Depending on the decision logic of the containment system (described below), the microprocessor 306 can communicate instructions to the throttle interface 308 to change speed or direction. The throttle interface 308 is connected to the motor controller 312, which can adjust the motor according to the instructions from the microprocessor 306. For example, if the cart 30 crosses the stop line 42, the microprocessor 306 can instruct the throttle interface 308 to ignore the driver's input to the throttle 310 and can further instruct the throttle interface 308 to slow or stop the cart.

Optionally, the microprocessor 306 can communicate with a steering position sensor 314 in the cart 30 to determine the directional heading of the cart 30.

In one embodiment, the throttle interface 308 is configured so that the microprocessor 306 can only reduce the speed of the cart 30 relative to the speed requested by the driver of the cart through the throttle 310. In this embodiment, the CIU 300a is configured not to increase the cart speed and (optionally) not to change the direction of travel of the cart. This embodiment beneficially increases the safety of the cart containment system in the case of a logic error by the microprocessor 306 (or other system component such as the CCU). For example, if the microprocessor 306 erroneously issues a command for the throttle interface 308 to cause the cart to move, the cart 30 will nonetheless come to a stop if the driver releases the throttle 310.

Figure 5B:
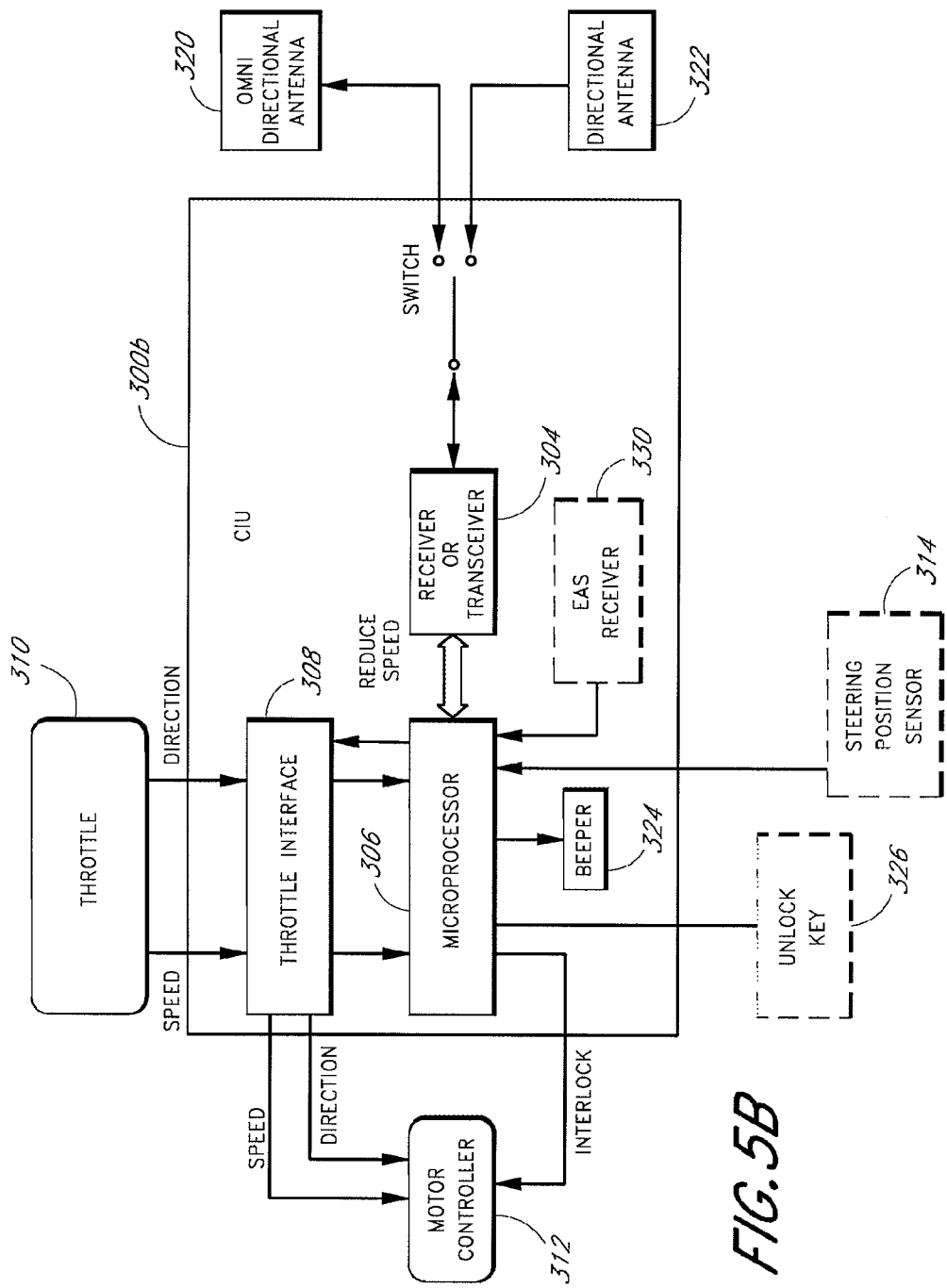
FIG. 5B is a block diagram of another example of a CIU that can be used with RSSI localization systems.

FIG. 5B schematically illustrates an example of a CIU 300b that can be used with a cart containment system that utilizes RSSI for localization of a cart. Some features of the CIU 300b are generally similar to the CIU 300a shown in FIG. 5A, and only the differences will be further described. The CIU 300b includes two antennas: an omnidirectional antenna 320 and a directional antenna 322. In some implementations, however, the antennas 320 and 322 may both be omnidirectional or directional. The omnidirectional antenna 320 may be an S151AM-2450S collinear dipole antenna available from Nearson, Inc. (Springfield, Va.), and the directional antenna 322 may be an LPY244P four-bay patch antenna available from Ramsey Electronics (Victor, N.Y.). In the example shown in FIG. 5B, the antennas 320 and 322 are positioned outside the CIU 300b at other locations on the cart 30. For example, one (or both) antennas 320, 322 may be disposed on a support structure extending above the frame of the cart 30 (e.g., on a pole that supports a safety light).

The CIU 300b can include an alarm unit such as the beeper 324 shown in FIG. 5B. As described above, the alarm unit can be part of a warning system that provides, for example, an audible alert to the driver if the cart 30 crosses a limit line.

The CIU 300b shown in FIG. 5B has an interlock system by which the microprocessor 306 can lock the motor controller 312 to prevent further movement of the cart 30. The interlock can be overridden by using an optional unlock key 326 that can be accessed by an authorized store employee. In some embodiments, the unlock key 326 is a manual lock-and-key unit, while in other embodiments, the unlock key 326 is electronically actuated by, for example, a signal broadcast from the store's CCU or from a mobile control unit carried by an authorized store employee. The interlock system can be part of an external override system as described above. In some embodiments, the CIU 300*b* also includes a switch that can be used to connect either or both of the antennas 320, 322 to the transceiver 304.

The CIU 300*b* is preferably mounted in the front portion of the cart 30 which enables the CIU to detect limit line signals (e.g., EAS or VLF) when the front, rather than the back, of the cart is nearing the limit line. Additionally, by mounting the CIU 300*b* so that it turns with the steering column of the cart 30, the cart's pointing direction (e.g., heading) may be determined. For example, a reference transmitter can broadcast a signal, and the CIU can compare the RSSI values detected by the omnidirectional antenna 320 and by the directional antenna 322 to determine a heading. Such implementations may eliminate the need for the optional steering position sensor 314. In some implementations, the reference transmitter can be a 2.4 GHz signal from a wireless access point, such as the access point described with reference to FIGURE 10 of the Two-Way Communication Application.

In some embodiments, the CIU is configured with a unidirectional receiver and can detect RF signals (e.g., EAS, VLF, wireless AP) in order to determine the location of the cart. The CIU then uses suitable decision logic (discussed below) to determine whether, for example, to inhibit cart motion or provide a warning. A unidirectional receiver can also be used to receive commands from a CCU, a mobile control unit, or an wireless external override system. However, in other embodiments, the CIU is configured with a bidirectional receiver (e.g., a transceiver). In such embodiments, the CIU can receive signals as described above as well as transmit signals to external receivers or transceivers. Such embodiments may use the bidirectional receiver to transmit information including but not limited to the status of cart components (e.g., battery level), cart location, whether the cart containment system has been activated, wheel lock status, or any other suitable information.

In certain embodiments, such as an autonomous containment system wherein the CIU is not configured to communicate with external RF devices, the antennas 302, 320, and 322 and the transceiver 304 are optional components.

V. Decision Logic for a Cart Containment System

The cart containment system is adapted to use decision logic to determine whether to take certain actions when a cart is in the vicinity of the store exit. As described above, these actions include but are not limited to warning a driver, inhibiting cart motion, and locking the cart's wheels. The particular decision logic may be based on the specific configuration of the retail store, the types of permitted and prohibited cart tracks, the number of limit lines used, and the type of information that can be acquired about the cart's speed, location, and direction. The decision logic can include a set of default rules as well as rules tailored for a particular implementation of the system.

The decision logic and the various functions of the containment system may be embodied in or controlled by executable software code that is stored in a computer memory or other computer storage device. The software code may be executable by a general purpose computer or processor. Some of the functions alternatively may be implemented in-whole or in-part in hardware such as application-specific integrated circuits (ASICs), field-programmable gate arrays (FPGAs), and programmable logic devices (PLDs). Some or all of the decision logic and system functions may be implemented by the CIU on the cart; however, some logic and functions may be implemented on a remote processor that communicates with the CIU. Any feasible combination of the various features, functions, and decision logic described herein may be embodied in a given system, and all such combinations are contemplated.

The decision logic presumes that the containment system has access to information including, but not limited to, locations of the limit lines and location and movement of the cart relative to the limit lines. In various implementations, location can include, for example, a two-dimensional coordinate position, an angular bearing from a fixed object, or a measure of proximity to a transmitter or marking line. In some cases, cart location information includes the orientation of the cart. In some autonomous systems, since the cart can detect only whether it has (or has not) crossed a limit line, location information is generally qualitative (e.g., whether the cart is on the store-side or the exit-side of the limit line). However, in other systems (particularly in some commanded systems), cart location information includes quantitative location information, e.g., a measured distance or a bearing angle.

The information used in the decision logic may also include the orientation of the cart and its direction of travel of the cart 30 including, for example, whether the cart 30 is moving toward the store, toward an exit, or approximately parallel to one or more limit lines. The information may also include data obtainable from the cart's motor, motor controller, steering controller, throttle, or other component. For example, the data may include a throttle value and whether the motor is operating in forward or reverse. In some cases, the data may include the speed and/or directional heading of the cart. For example, the navigation system described in the above-incorporated navigation system application provides an estimate of a cart's speed and heading based on the rotational motion of one (or more) of the cart's wheels.

The decision logic may also account for characteristics of the store (e.g., its layout), characteristics of the carts (e.g., the distance needed for a cart to coast to a stop), and/or other optional features such as whether warnings are given to the cart driver. The decision logic may also provide for different actions to be taken depending on the type of limit-line marking signal received by the CIU (e.g., EAS or VLF). Many variations in decision logic are possible.

Figure 6A:
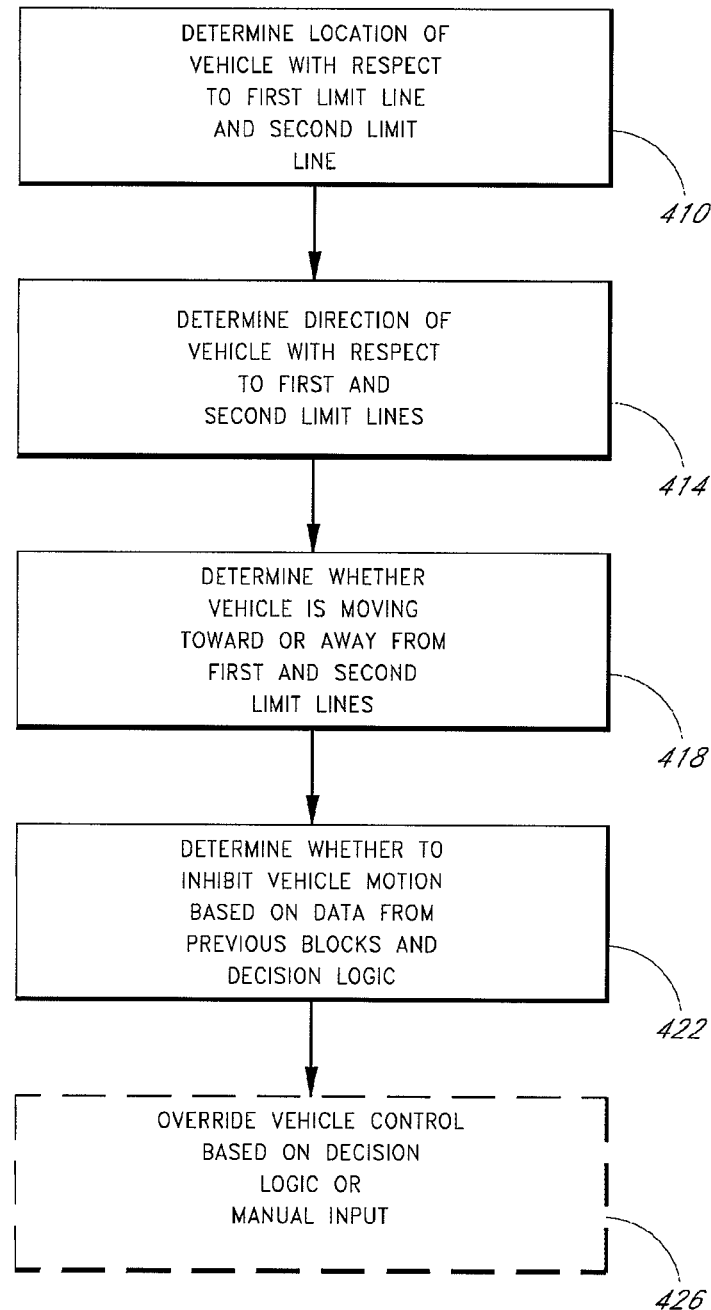
FIG. 6A is a flow chart illustrating an example of a process flow that may be used to determine whether to permit or inhibit cart motion.

FIG. 6A is a block diagram for the process flow in a cart containment system using two limit lines. This example is not intended as a limitation on the range of decision logic that is possible and is intended as an illustrative example only. The decision logic, with suitable variations, is applicable to both autonomous and commanded containment systems. In block 410 the system determines the location of the cart (or other vehicle) with respect to a first limit line (e.g., the caution line 44 shown in FIGS. 2 and 3) and a second limit line (e.g., the stop line 42 shown in FIGS. 1-3). In block 414, the system determines the direction of motion of the cart with respect to the first and the second limit lines. If the cart is moving away from the limit lines, generally no action is taken. In block 418, the system determines the movement of the cart with respect to the limit lines. For example, the system may use cart localization information to determine whether the cart has crossed the first limit line, is between the first and the second limit lines, or has moved passed the second limit line and is approaching a restricted area. In block 422, the system uses information from blocks 410-418 and decision logic to determine what actions to perform. For example, the system may issue a warning to the driver to slow down or stop, or may actuate one or more cart motion inhibition mechanisms (e.g., cutting power to the cart's motor or setting a brake or a wheel lock). The system may decide to perform no action in certain cases. Some containment systems implement an optional block 426 to provide methods to override the decisions and actions of the system taken in block 422. For example, the system may override the decision to inhibit cart motion if the cart has not fully stopped before reaching the restricted area. In some optional implementations, manual input, for example, from an authorized store employee, may be used to override system actions. For example, the authorized store employee may use a mobile control unit to re-enable power to the cart and/or to unlock the cart's wheels. Many variations of the decision logic illustrated in FIG. 6A are possible, and all such variations are contemplated.

Figure 6B:
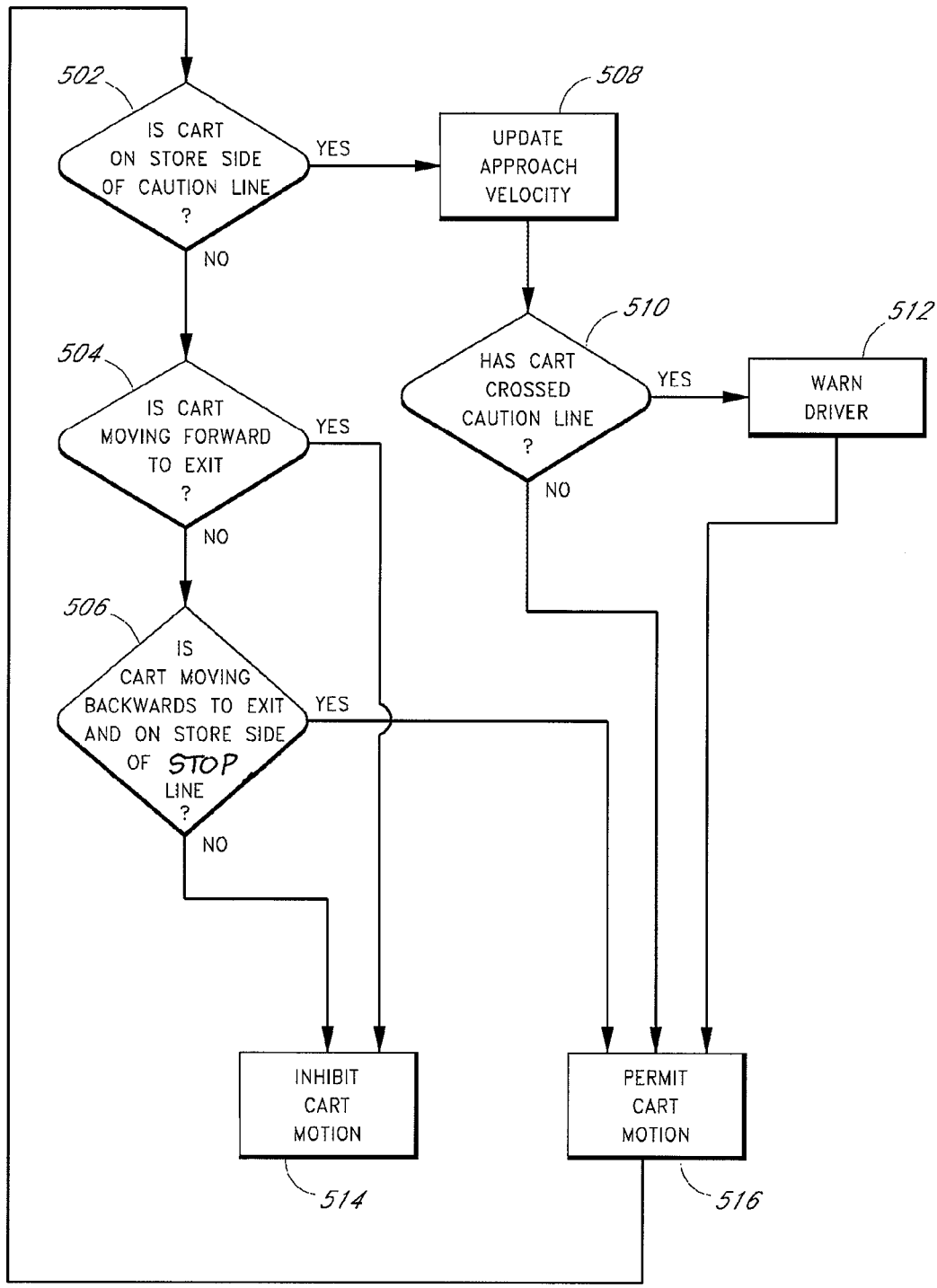
FIG. 6B is an example of decision logic configured to determine whether to permit or inhibit cart motion.

FIG. 6B is an example of decision logic used by the containment system to determine whether to permit or inhibit movement of a cart. The decision logic may be used in autonomous or commanded cart containment systems and presumes the system utilizes two limiting lines: a caution line and a stop line (see, e.g., FIGS. 2 and 3). The decision logic in FIG. 6B is an example of the decision logic discussed with reference to block 422 in FIG. 6A.

In block 502, a determination is made whether the cart is on the store side of a caution line. For example, if the cart has started moving on a track inside the store (e.g., track 32 in FIG. 1 or track 38 in FIG. 2), and the CIU has not detected the caution line, the system will assume the cart is on the store side of the caution line. In this case, the system in block 508 updates the cart's velocity of approach to the caution line and then in block 510 continues to inquire as to whether the cart has crossed the caution line. As long as the cart has not crossed the caution line, the system permits the cart to continue moving (block 516). The decision logic returns to block 502, where the system again inquires whether the cart is on the store side of the caution line.

Referring again to block 510, if it is determined that the cart has crossed the caution line, the system in block 512 issues a warning to the driver. The warning may be an audible warning such as a sound (e.g., a beep) or a voice synthesized warning the driver to slow down. Alternatively, the warning may be visual such as turning on a light (e.g., a red LED indicator). The warning can include both audible and visual alerts to the driver. In block 516, the system continues to permit motion of the cart, and the decision logic returns to block 502. In this case, since the system has already determined in block 510 that the cart has crossed the caution line, the answer to the inquiry in block 502 is negative, and the logic continues to block 504.

In block 504, the system determines whether the cart is continuing to move forward toward the store exit. If so, in block 514 the system inhibits motion of the cart by, for example, cutting power to the cart motor, reducing the cart's throttle, or applying a brake or a wheel lock. Returning again to block 504, if the system determines the cart is not moving forward toward the exit, the system in block 506 determines whether the cart is moving backwards toward the store exit and whether the cart is on the store side of the stop line. If the result of both of these determinations is affirmative, the cart may be executing a "y"-turn to back up out of a charging spot (e.g., track 36 shown in FIG. 2). Accordingly, the inquiry in block 506 is affirmative, and the logic moves to block 516 wherein the system permits the cart to continue moving. However, if the result of either of these determinations is negative, then the inquiry in block 506 is negative and the system assumes the cart is attempting to exit the store in reverse. The decision logic moves to block 514 where the system inhibits cart motion.

Figure 6C:
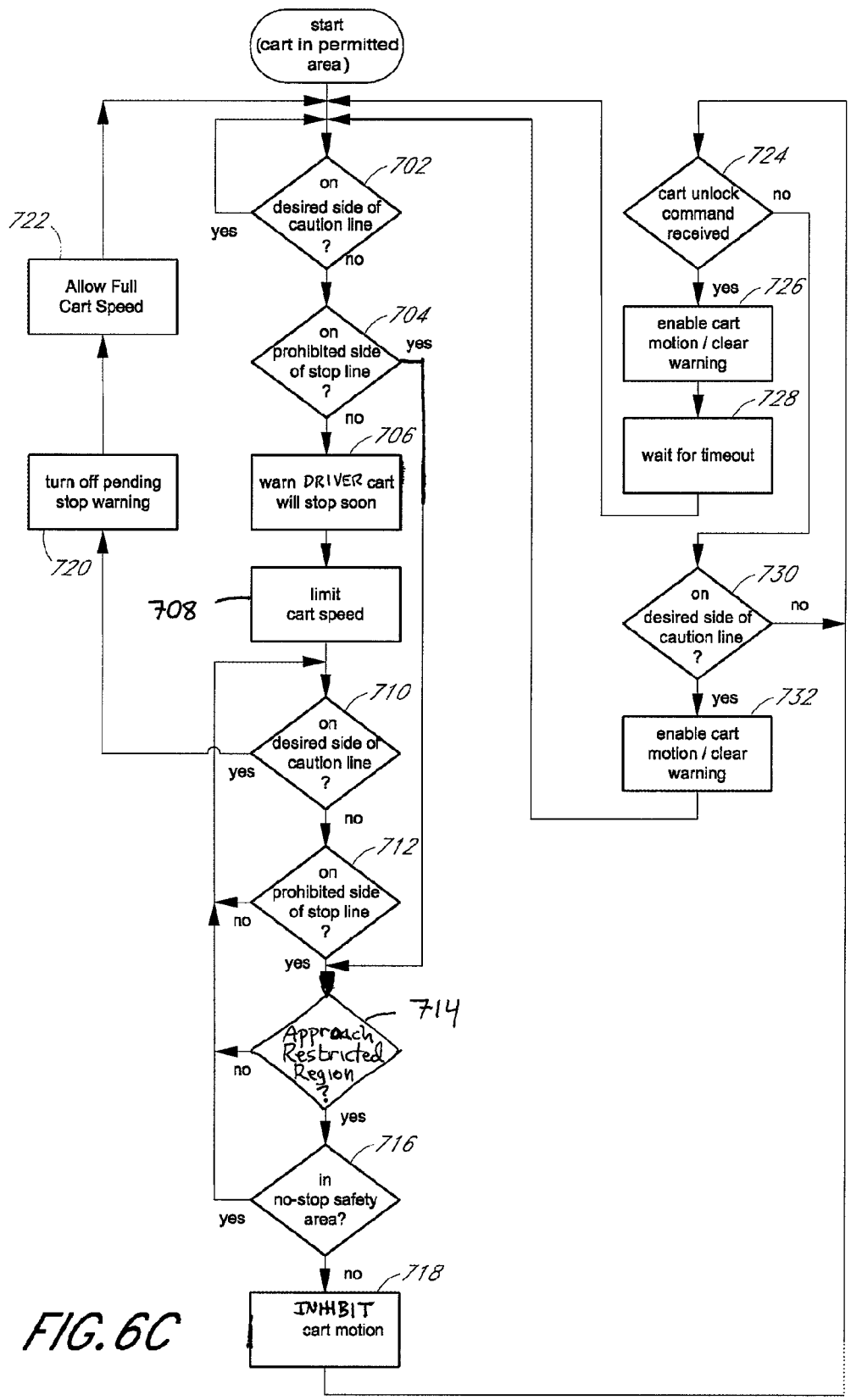
FIG. 6C is a flow chart comprising decision logic describing operation of a cart containment system.

FIG. 6C is an example of decision logic describing operation of a cart containment system that includes two limit lines: a caution line and a stop line (see, e.g., FIGS. 2 and 3). The decision logic starts with the assumption that the cart is in a permitted region, e.g., the cart has not crossed the caution line or the stop line. In block 702, the system continues to monitor the status of the cart to determine if the cart is on the permitted side of the caution line. If the cart crosses the caution line, in block 704 the system determines whether the cart is on the prohibited side of the stop line. If the cart has crossed the stop line, the decision logic continues to block 714, which will be described below. However, if the cart has not yet crossed the stop line, the decision logic continues to block 706 where the system warns the driver that the cart will stop soon and block 708 where the system limits the speed of the cart to a value that is below the full cart speed.

In block 710, the system determines whether the cart is on the desired side of the caution line (e.g., the store side). If the cart is still on the desired side, the decision logic assumes that the cart is not attempting to enter the restricted region, and the logic continues to block 720 where pending stop warnings are turned off and block 722 where full cart speed is restored. The decision logic returns to block 702 and the system continues to monitor the cart's location relative to the limit line as described above.

Returning to block 710, if the system determines that the cart is not on the desired side of the caution line (e.g., it is on the exit side rather than the store side), then the decision logic continues to block 712, where the system determines if the cart is on the prohibited side of the stop line. If the cart is not on the prohibited side of the stop line, the decision logic returns to block 710, and the system continues to monitor the location status of the cart.

If the cart is on the prohibited side of the stop line, the logic continues to block 714 where the system determines whether the cart is approaching the restricted region (e.g., the store exit). In some implementations, the system makes this determination by comparing the location of the cart relative to the restricted region at different times. In implementations in which the cart has a steering sensor, the system can make this determination by examining the cart's steering angle and direction of motor operation (e.g., whether a throttle is in forward or reverse). For example, the system can determine that the cart is approaching a store exit if either: (i) the steering angle is in the direction of the exit and the throttle is in forward; or (ii) the steering angle is directed away from the exit and the throttle is in reverse.

In block 714, if the cart is not approaching the restricted region, the decision logic returns to block 710, and the system continues to monitor the cart's location as described above. However, if the cart is approaching the restricted region, in block 716 the system determines whether the cart is located in a "no-stop" safety area where it would be unsafe (or otherwise inconvenient) to stop the cart. If the cart is in the no-stop safety area, the system does not take action to stop the cart, but continues to monitor the location of the cart as described above (e.g., the decision logic returns to block 710). However, if the cart is not in the no-stop area, in block 718 the system inhibits cart motion by using any of the methods described herein (e.g., cutting power to the cart motor or actuating a brake or a wheel lock).

The system continues to monitor the status of the cart after the system has inhibited motion of the cart into the restricted region. In block 724, the system determines whether a command to unlock the cart has been received. An unlock command may be provided to the cart by an external override system, by actuation of a manual override switch by an authorized store employee, or by any other suitable method. If an unlock command is received in block 724, the system in block 726 enables cart motion and clears any warnings (e.g., audible or visual alerts). In block 728, the system waits for a timeout period before returning to block 702 where the system again begins to monitor the cart location. The length of the timeout period can be selected to be long enough to permit an authorized store employee to drive the cart out of the restricted region and back into the permitted region without having the containment system further inhibit the cart motion.

Returning again to block 724, if no cart unlock command is received, the decision logic moves to block 730, where the system determines whether the cart is on the desired side of the caution line. If it is not, the logic returns to block 724 and waits for the unlock command. However, in block 730, if the cart is on the desired side of the caution line (e.g., it has been dragged or otherwise moved back into the permitted region), the system in block 732 enables cart motion and clears any warnings, and the logic returns to block 702 where the system continues to monitor the cart location.

Cart containment systems may use the example decision logic illustrated in FIGS. 6B and 6C. However, other implementations of the system may use alternate decision logic that is designed for the specifics of a particular retail store environment. Further, it is to be understood that not all embodiments of the decision logic need use each of logic blocks shown and described with reference to FIGS. 6B and 6C. For example, some or all of the logic blocks can be combined, modified, eliminated, and/or used in different orders. Additional logic blocks can be used as required by the implementation in a particular facility or environment. Many variations of decision logic are contemplated.

Although this invention has been described in terms of certain embodiments and implementations, other embodiments and implementations that are apparent to those of ordinary skill in the art, including embodiments which do not provide all of the features and advantages set forth herein, are also within the scope of this invention. For example, in any method or process described herein, the acts or operations of the method/process are not necessarily limited to any particular disclosed sequence. Also, for purposes of contrasting different embodiments, certain aspects and advantages of these embodiments are described where appropriate. It should be understood that not necessarily all such aspects and advantages need be achieved in any one embodiment. Thus, it should be recognized that certain embodiments may be carried out in a manner that achieves or optimizes one advantage or group of advantages without necessarily achieving other aspects or advantages that may be taught or suggested herein. Accordingly, the scope of the present invention is intended to be defined only by reference to the claims.

What is claimed is:

1. A system for inhibiting a motorized cart from passing through a restricted region of a retail area, the system comprising:
   a sensor located on a motorized cart for use inside an indoor retail space, the sensor configured to receive a first electromagnetic signal and a second electromagnetic signal, wherein the first electromagnetic signal is transmitted by a first source and the second electromagnetic signal is transmitted by a second source, the first source being spaced from the second source, the first electromagnetic signal and the second electromagnetic signal each being transmitted at least near a restricted region where movement of the motorized cart is to be inhibited; and
   a controller in communication with the sensor, the controller configured to generate a first Received Signal Strength Indication (RSSI) value corresponding to the signal strength of the first electromagnetic signal received by the sensor and a second RSSI value corresponding to the signal strength of the second electromagnetic signal received by the sensor, the processor also configured to compare the first RSSI value and the second RSSI value to determine proximity and direction of travel of the sensor relative to the restricted region, wherein the controller is further configured to provide a command to an inhibition system in response to the determined proximity and direction of travel of the sensor relative to the restricted region, wherein the inhibition system is configured to reduce ability of the motorized cart to move.

2. The system of claim 1, wherein the controller is further configured to determine proximity and direction of travel of the sensor relative to the restricted region only if the first RSSI value or the second RSSI value exceed a threshold value.

3. The system of claim 1, wherein the restricted region is located in or adjacent to the indoor retail space.

4. The system of claim 1, wherein the inhibition system comprises a brake or a motor interrupt.

5. The system of claim 1, wherein at least one of the first source and the second source comprises a wireless access point.

6. The system of claim 1, wherein at least one of the first source and the second source comprises a buried wire and at least one of the first electromagnetic signal and the second electromagnetic signal comprises a VLF signal.

7. The system of claim 1, wherein at least one of the first source and the second source is located near an exit of the retail space.

8. The system of claim 1, wherein the sensor comprises a plurality of antennas.

9. The system of claim 8, wherein at least one of the antennas is directional and at least one of the antennas is omni-directional.

10. A method for inhibiting a motorized cart from passing through a restricted region of a retail area, the method comprising:
    under control of a control system in communication with a sensor located on a movable motorized cart for use inside an indoor retail space:
    receiving a first electromagnetic signal and a second electromagnetic signal, the first electromagnetic signal transmitted by a first source and the second electromagnetic signal transmitted by a second source, the first source spaced from the second source, the first electromagnetic signal and the second electromagnetic signal each being transmitted at least near a restricted region where movement of the motorized cart is to be inhibited; and
    generating a first Received Signal Strength Indication (RSSI) value corresponding to the signal strength of the first electromagnetic signal received by the sensor and a second RSSI value corresponding to the signal strength of the second electromagnetic signal received by the sensor;
    comparing the first RSSI value and the second RSSI value;
    determining proximity and direction of travel of the sensor relative to the restricted region; and
    issuing an inhibition command to reduce the ability of the motorized cart to move in response to the determined proximity and direction of travel of the sensor relative to the restricted region.

11. The method of claim 10, wherein the method further comprises providing a warning if the determined proximity and direction of travel of the sensor relative to the restricted region indicate that the motorized cart is approaching the restricted region.

12. The method of claim 10, wherein the method further comprises:
   issuing an override command from a device in communication with the control system; and
   overriding the inhibition command in response to the override command, thereby reenabling the ability of the motorized cart to move.

13. The method of claim 12, wherein the method further comprises waiting a timeout period after overriding the inhibition command, the ability of the cart to move not being inhibited during the timeout period.

14. A control system for a mobility cart confinement system, the control system comprising:
   a detector disposed on a mobility cart for use in a retail environment, the detector configured to receive a wakeup signal wirelessly transmitted by a source disposed in or near a restricted region, the signal comprising a Received Signal Strength Indication (RSSI) threshold; and
   a processor in communication with the detector, the processor configured to:
      generate a RSSI value corresponding to the strength of the signal;
      determine whether to initiate a localization system based on a comparison of the RSSI value and the RSSI threshold, the localization system configured to localize the mobility cart relative to the source based on the signal; and
      determine whether to initiate an inhibition system based on the localization of the mobility cart relative to the source, the inhibition system configured to reduce the mobility of the mobility cart.

15. The control system of claim 14, wherein:
   the localization system is initiated if the RSSI value exceeds the threshold value; and
   the inhibition system is initiated if the mobility cart is localized within the restricted region.

16. The control system of claim 14, wherein:
   the detector is further configured to transmit a receipt indication in response to receipt of the signal;
   the source is further configured to receive the receipt indication and to transmit to the detector an acknowledgement indication in response; and
   the processor is further configured to identify whether the detector received the acknowledgement indication and to request that the receipt indication be retransmitted if the acknowledgement indication was not received.

17. The control system of claim 14, wherein the detector is configured to transmit the generated RSSI value and a mobility cart identifier to the source.

18. The control system of claim 14, wherein the detector is further configured to receive a second signal from a second source, and
   the localization system is further configured to localize the mobility cart relative to at least the first source based on the first signal and the second signal.

19. The control system of claim 14, wherein the signal further comprises a synchronization pattern, a source address, and a destination address.

20. The control system of claim 14, wherein:
   the control system further comprises a plurality of signal transmitting sources, each source having a designated spatial zone, the signal of each source further comprising a source address; and
   the processor is further configured to respond to the signal from the source corresponding to the spatial zone in which the mobility cart is located, and to not respond to signals from other sources.

* * * * *